United States Patent [19]
Yano et al.

[11] Patent Number: 6,088,737
[45] Date of Patent: Jul. 11, 2000

[54] INFORMATION PROCESSING SYSTEM AND CONTROL METHOD THEREOF

[75] Inventors: Koichi Yano, Kawasaki; Toshihiko Fukasawa, Machida, both of Japan

[73] Assignee: Canon Kabushiki Kaisha, Tokyo, Japan

[21] Appl. No.: 08/955,693

[22] Filed: Oct. 22, 1997

[30]     Foreign Application Priority Data

Oct. 25, 1996  [JP]  Japan ..................................... 8-284450
Nov. 29, 1996  [JP]  Japan ..................................... 8-320563

[51] Int. Cl.⁷ ............................. G06F 13/00; G06F 11/30
[52] U.S. Cl. .......................... 709/235; 709/225; 709/224
[58] Field of Search ................................... 709/224, 235, 709/234, 203, 218, 219, 217; 370/229

[56]               References Cited

U.S. PATENT DOCUMENTS

| | | | |
|---|---|---|---|
| 5,555,377 | 9/1996 | Christensen et al. .................... | 709/247 |
| 5,706,436 | 1/1998 | Lewis et al. ............................. | 709/235 |
| 5,870,557 | 2/1999 | Bellovin et al. ......................... | 709/224 |
| 5,878,224 | 3/1999 | Smith ...................................... | 709/224 |

OTHER PUBLICATIONS

Tzi–cker Chieuh et al.; An Empirical Study of Admission Control Strategies in Video Servers; Aug. 1998 Inernational Conf. on Parallel Processing; pp. 313–320.

FTPD(8); DARPA Internet File Transfer Protocol Server, Jan. 1993.

FTPACCESS(5); ftpdaccess—FTPD Configuration File, Jan. 1993.

Ed Chang et al.; Admissions Control and Data Placement for VBR Video Servers; IEEE International Conference on Image Processing; pp. 278–282, Nov. 1994.

Ernst Biersack et al.; Statistical Admission Control in Video Servers with Variable Bit Rate Streams and Constant Time Length Retrieval; Proceedings of the 22nd EUROMICRO Conference ; pp. 633–639, Sep. 1996.

*Primary Examiner*—Kenneth R. Coulter
*Attorney, Agent, or Firm*—Morgan & Finnegan LLP

[57]               ABSTRACT

Information processing system and control method thereof is provided. A camera server apparatus determines, upon receiving a connection request from a client, whether or not an additional client to the number of clients who are currently being connected would exceed a permissible number. If it is determined that the number of clients exceeds the permissible number, image data is not transferred to the client apparatus which has just sent the connection request, instead, information indicative of the current access state is transferred. Accordingly, the client side is able to know the access state of the camera server with which the client wants to connect.

35 Claims, 15 Drawing Sheets

| | NUMBER OF ACCESSES | NUMBER OF ACCESS REJECTED | NUMBER OF ACCESS PERMITTED | |
|---|---|---|---|---|
| 0:00~0:10 | 3 | 0 | 1 | |
| 0:10~0:20 | 4 | 0 | 2 | |
| ⋮ | ⋮ | ⋮ | ⋮ | |
| 12:00~12:10 | 28 | 3 | 5 | ← PRESENT TIME |
| | 40 | 10 | 1 | |
| DATA FROM PREVIOUS DAY | 32 | 10 | 1 | |
| ⋮ | ⋮ | ⋮ | ⋮ | |
| 23:50~24:00 | 5 | 0 | 1 | |

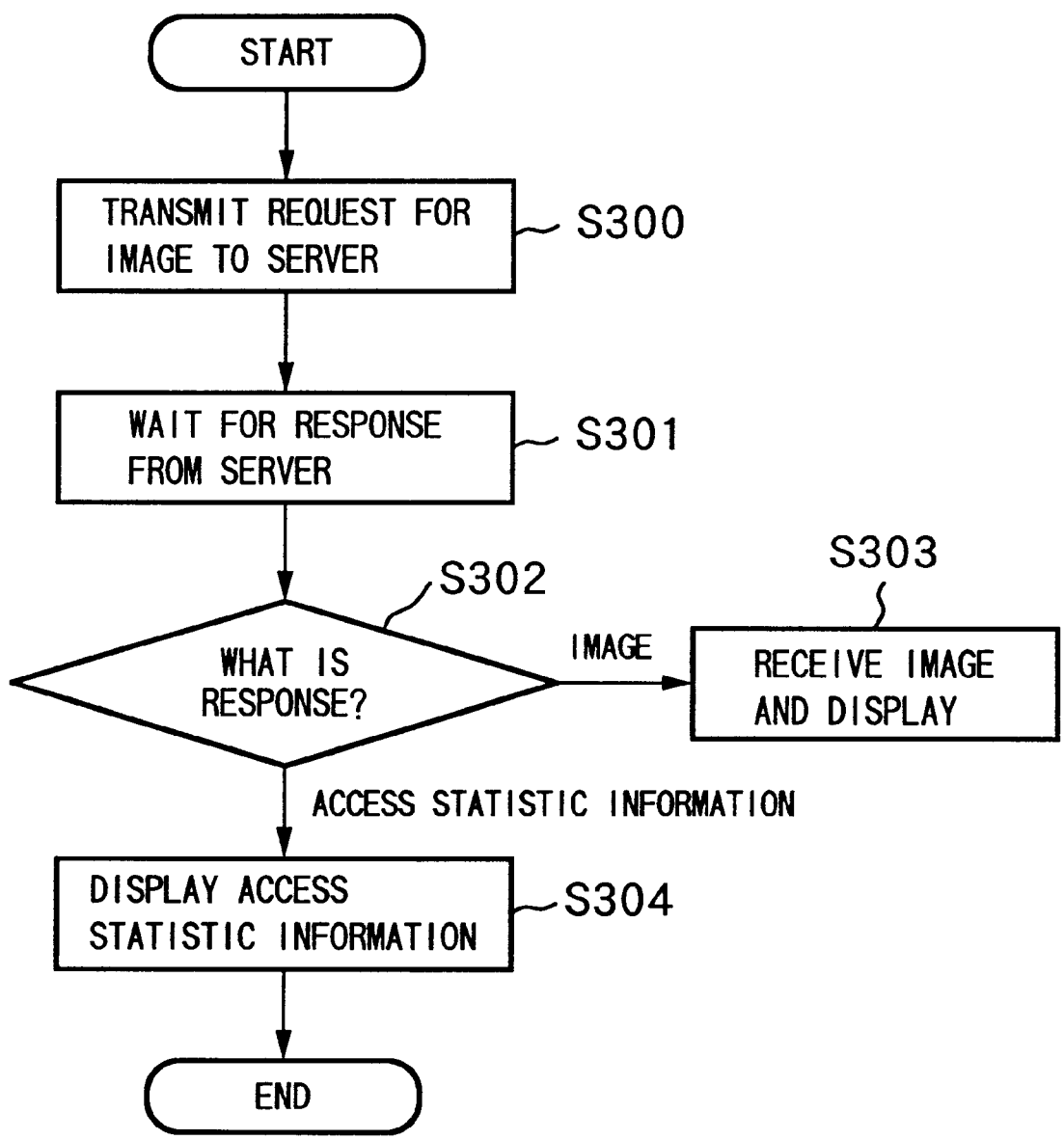

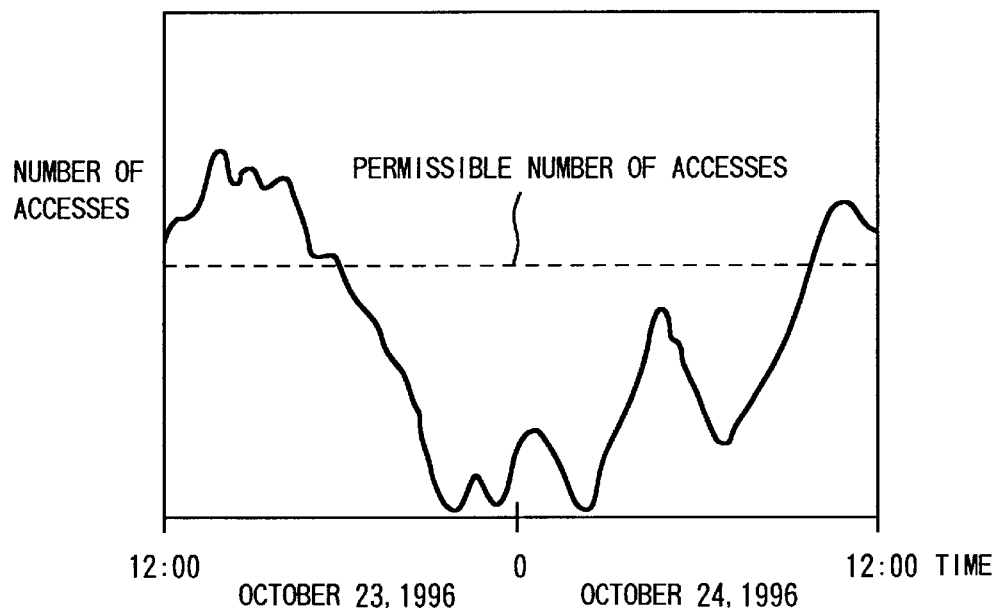

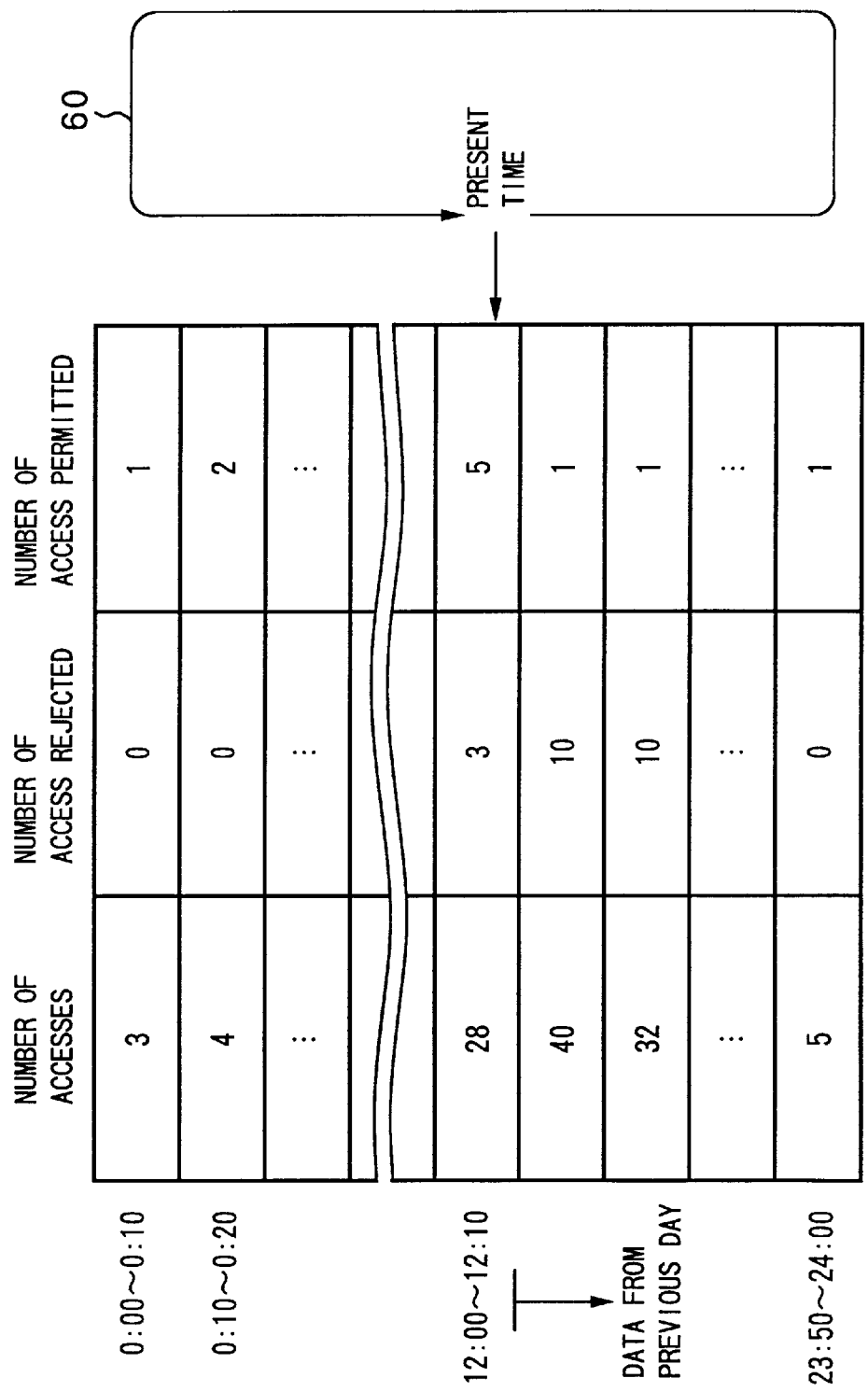

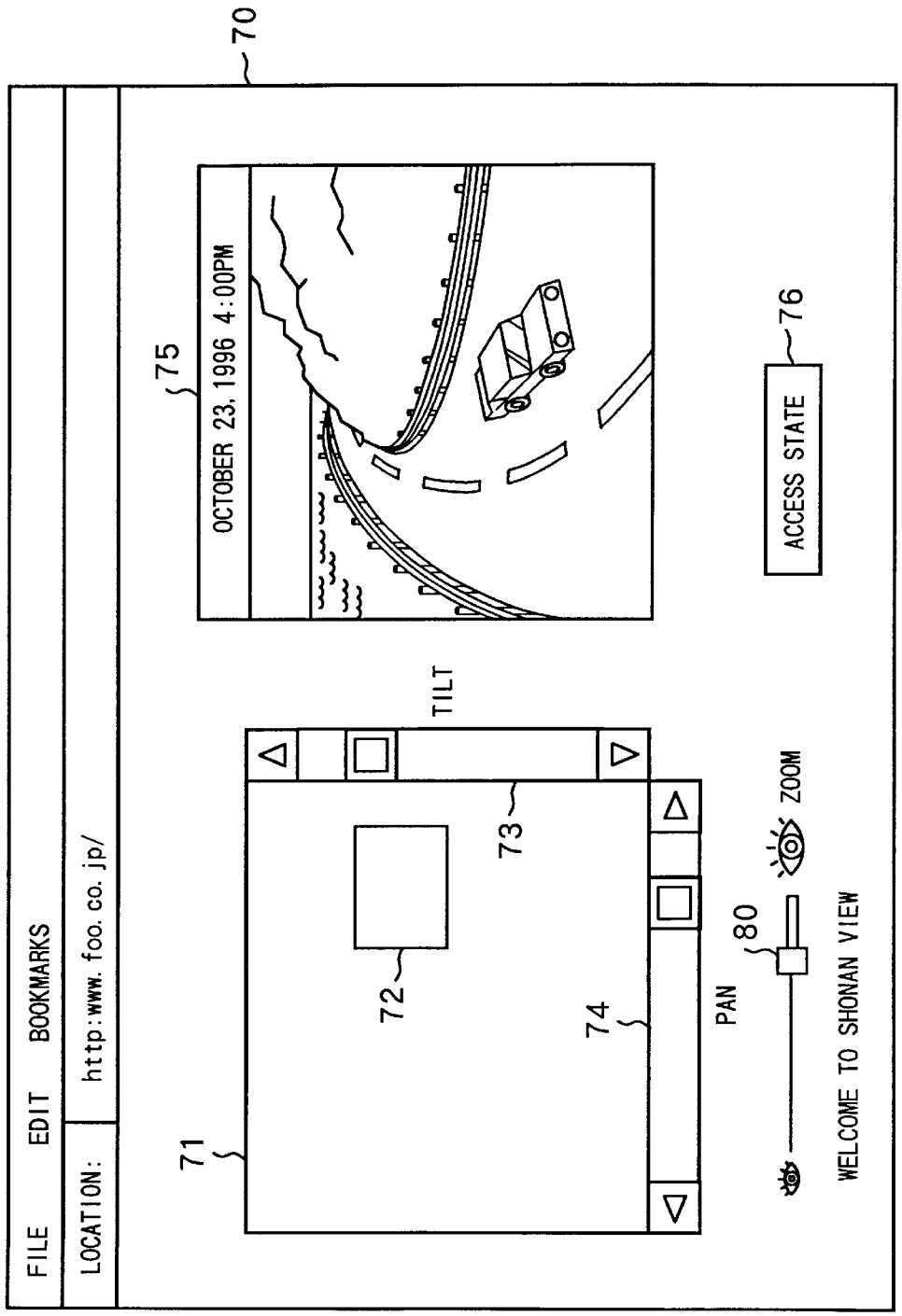

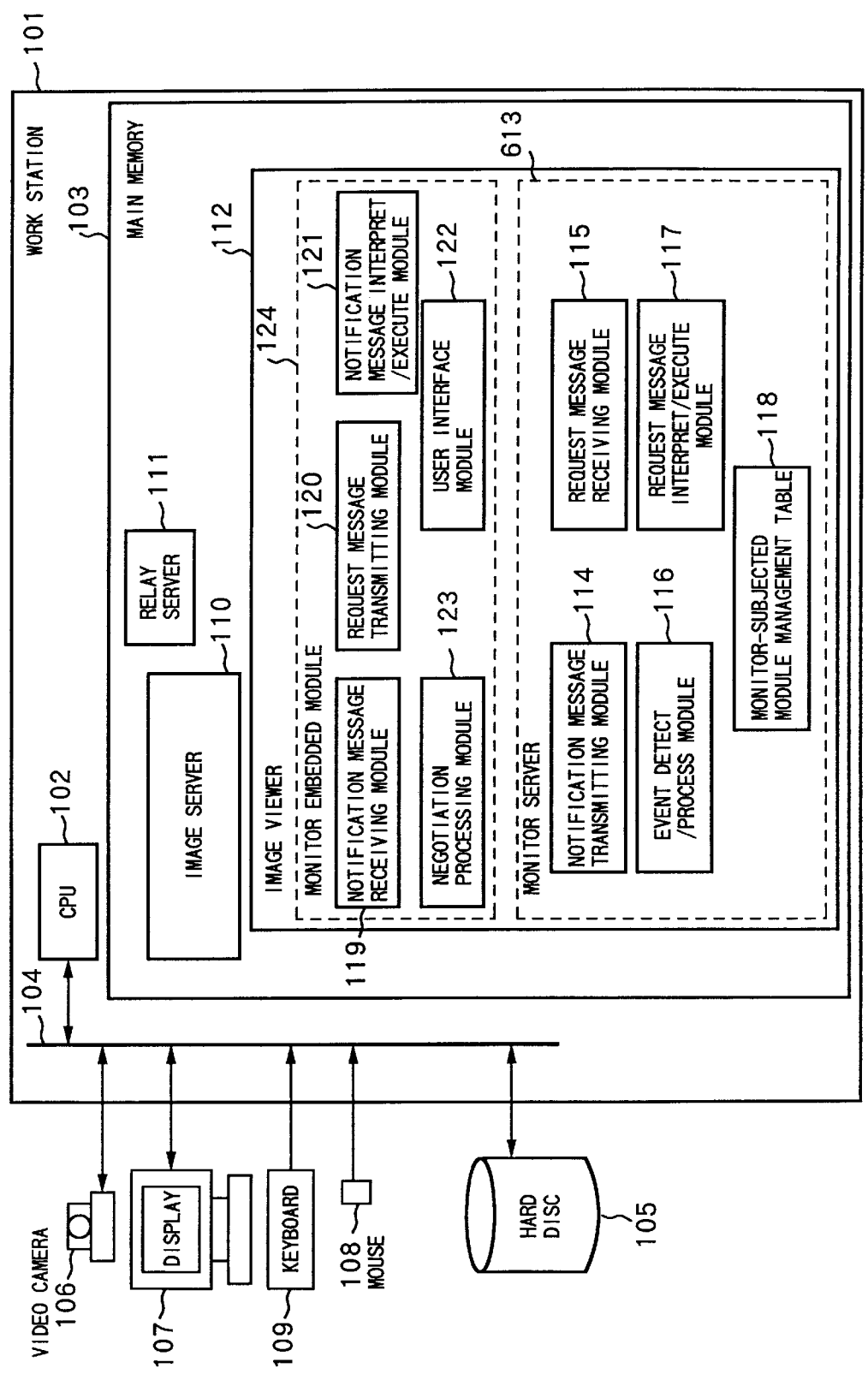

INFORMATION PROCESSING SYSTEM AND CONTROL METHOD THEREOF

BACKGROUND OF THE INVENTION

The present invention relates to an information transmission service provided via a network such as Internet, LAN or the like. More particularly, the present invention relates to a camera control system comprising a camera server which controls a camera to capture an image sensed by the camera and a camera client which remotely operates the camera, also relates to the camera server, camera client, method of controlling thereof and a computer-readable memory medium.

Furthermore, the present invention relates to a method of realizing a service which transmits image/audio/document data on a computer network such as Internet, LAN or the like. Particularly, the present invention relates to an information processing system and method of a mechanism for monitoring operational states in the service realized by a client-server form to handle information such as image/audio data which constantly changes.

Since high-speed LAN has become available and Internet is now widely used, a user has more chance to use various services (information or games), provided by computers located in a remote place, via computer network. As a typical example of such service, the service provided by WWW (World Wide Web) for offering document information, or the service provided by VOD (Video on Demand) for broadcasting moving pictures and audio data, are available.

Normally, the system for providing such services (hereinafter referred to as a "service system") is realized in the server-client form. In the service system of this type, a server program (hereinafter referred to as a "server") is operated on an appropriate computer (hereinafter referred to as a "host") connected to a network to offer the service such as information offer or the like. A user of the service (hereinafter referred to as a "user") starts a client program (hereinafter referred to as a "client") on the nearest host and uses the service provided by the server.

As an example of the system in the server-client form, inventors of the present invention have suggested several systems which can view an image sensed by a camera apparatus by operating the camera apparatus which is connected to a camera server located in a remote place via a network.

According to the suggested systems, for instance, a user is able to view an image of a sight-seeing spot without leaving home, by utilizing Internet as the network. Therefore, the future of these systems is promising.

More specifically, a camera server which directly controls a camera is provided on the Internet. An image sensed by the camera is transferred in real time to a client who is connected to the server.

However, since Internet has a limited transmission bandwidth in the network, the number of users who can actually receive the image is limited.

Therefore, when the number of clients connected to the server exceeds an appropriate number, and if another access request is transmitted by a new client, a warning message informing "cannot access because busy" is transmitted to the new client and transferring of an image is not performed, or the access request to the server is rejected.

However, when the access request is rejected, the user is uninformed of information such as the number of clients who are presently requesting to receive the image, or the volume of traffic on the camera server. In addition, a user is not given any suggestion as to whether to try sending the access request again or to give up sending the access request.

The above-described problem is not limited to a camera server which directly controls the video camera, but is also common to a server which transfers an image stored as data.

In addition, in the service system realized by the aforementioned server-client form, sometimes a relay server for relaying data is established between a server and a client in order to deal with an expanded scale of Internet/LAN. Expanding the scale of a computer network results in increase in the number of clients and increase in the amount of data flow in the network; consequently a large load is added to the server (hereinafter referred to as a main server in order to distinguish it from the relay server). To solve such problem, the relay server has been introduced.

The introduction of a relay server attains the following advantages:

i) reduced load on the main server;
ii) reduced load on the network; and
iii) reduced load on the client.

Hereinafter, each of the advantages will be described.

i) Reduced Load on the Main Server

By virtue of the introduction of the relay server, a part of the function of the main server can be performed by the relay server. Because the relay server incorporates the function to manage clients who utilize the service, the load added to the main server will not increase even if the number of clients increases.

ii) Reduced Load on the Network

A large-scale computer network such as Internet is realized by, in terms of physical connection, mutually connecting various lines (telephone lines, optical fiber and the like) having different bandwidths. Therefore, a certain line is able to transmit data in extremely high speed, while another line has capability to process only at one hundredth of that speed. If data is transmitted from the main server to a client without considering such difference, a client who is able to use a high-speed line can receive high-quality data, but a client who is able to use only a low-speed line receives partially-missing data or lose the entire data. In order to cope with such situation, the relay server makes adjustment to the amount of data or data quality to suit the processing capability of a network or a line so that all clients can receive the best service.

A moving-picture-transmission service in a VOD system is now taken as an example. It is assumed that two clients are accessing the server, one client being capable of communicating at 10 Mbps (Mega-bits per second) and the other client capable of communicating at 64 Kbps (Kilo-bits per second). In this condition, if an image where one frame has 500K bits is transmitted at twenty frames per second, the client capable of communicating at 10 Mbps can receive data without any problem. However, the other client capable of communicating at 64 Kbps requires eight seconds to transmit data corresponding to one frame.

To handle the above situation, the relay server converts moving-picture data transmitted by the main server into data where one frame has a 16K-bit data capacity, and transfers the converted data at four frames per second. Accordingly, the client capable of communicating at 64 Kbps is able to receive the service with some degree of quality.

iii) Reduced Load on the Client

The relay server can substitute not only for the function of the main server but also for the processing performed by a client. For instance, the process of converting data e.g.

images or the like, transmitted by the main server into a displayable form is normally performed by a client. However, in a case where data conversion is of a type which does not depend upon an internal structure of the client, or a case where there are plural clients who utilize the same form of data, the conversion processing can be performed by the relay server. As a result, processing performed by each client can be centralized, so that the load added to the client can be reduced.

On the other hand, introduction of the relay server generates the following problems to be solved:

i) maintenance difficulties because of the expanded scale of the service system; and ii) need to integrate plural services. Hereinafter, the above problems are discussed.

i) Maintenance Difficulties Because of the Expanded Scale of the Service System

As the network is expanded, a larger number of relay servers becomes necessary. Depending on a case, a structure where relay servers are configured in hierarchy may be possible. In such structure, relay servers are scattered through the network, making it difficult to manage.

For instance, it is assumed that there is a problem in a relay server and the processing of the relay server has stopped. A client who is located under the management of the relay server will not be able to use the service of the main server. The user side (client) can assume the following reasons as a cause of service stop:

service stop due to a problem on the main server;

temporary service delay due to an increased load on the main server;

relay processing stop due to a problem on the relay server; or temporary delay of relaying processing due to an increased load on the relay server.

In order to appropriately handle the situation, it is necessary to specify the cause which stopped the service.

If there is means to obtain sufficient information, it is possible to take necessary steps such as the followings, depending on the aforementioned causes:

make a phone call to a person responsible for the service;

use another relay server. Use another route/another line; or wait and observe the situation.

However, in the above example, the relay server, which is supposed to provide the client with the information regarding why the service is not available, has stopped. Therefore, the user is unable to specify the cause of the service stop. Thus, it is difficult to take an effective action.

ii) Needs To Integrate Plural Services

In the network environment, not only one service alone is used, but plural services are simultaneously used. For instance, simultaneous utilization of a moving-picture-transmission service and audio-data-transmission service can construct a TV phone service.

In view of the above, in order to solve the "maintenance difficulties because of the expanded scale of the service system," it is preferable to provide mechanism/means which can be widely used, rather than a mechanism/means which handles each of the service systems. In addition, such mechanism/means which can be widely used is effective in view of the situation where a version of the relay server is updated or the case of utilizing a relay server, a main server and a client manufactured by different manufacturers.

For instance, in the field of WWW, there is a mixture of clients (Web browser) manufactured by different manufacturers, causing a problem of incompatibility among browsers. There is a possibility that the similar problem occurs in other service systems besides WWW.

SUMMARY OF THE INVENTION

The present invention has been made in consideration of the above situation, and has as its object to provide an information processing system constructed by including a server and a client who processes data transmitted by the server, the server comprising: determining means for determining whether or not a number of predetermined types of access requests received by the server exceeds a predetermined permissible number; and transferring means for transferring access state information indicative of an access state to the client who has transmitted a predetermined type of access request, in accordance with the determining result made by the determining means, and the client comprising: displaying means for, upon transmitting the predetermined type of access request to the server and receiving the access state information from the transferring means, displaying the access state on the basis of the access state information.

Another object of the present invention is to provide a monitoring mechanism which is applicable to each component in an arbitrary service system.

Furthermore, an object of the present invention is, in a case where plural services are integrated, to provide a monitoring mechanism which can appropriately monitor operation state of each module which constitutes the service system.

To attain the above object, the monitor system according to the present invention has the following configuration. More specifically, it is a monitor system for monitoring an operation state of a service system which provides a predetermined service in a computer network, comprising: a monitor module communicable with other modules, which is provided separately from a plurality of service modules entered in the service system; receiving means for receiving, in the monitor module, a message from the plurality of service modules; communication means for performing communication between the monitor module and the plurality of service modules on the basis of the message; and processing means for executing corresponding processing on the basis of contents notified by the communication means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing a part of processing performed by a client according to the first embodiment;

FIG. 4 shows a message example displayed on a client according to the first embodiment when rejecting an access request;

FIG. 5 is a graph displayed on a client according to the second embodiment when rejecting an access request;

FIG. 6 is a table showing contents of an access state management table in the camera server according to the second embodiment;

FIG. 7 is an example of a display screen of a client according to the third embodiment;

FIG. 16 is a block diagram showing a construction of a remote image service system according to the fifth embodiment.

DETAILED DESCRIPTION OF THE PREFERRED EMBODIMENTS

Preferred embodiments of the present invention will be described in detail in accordance with the accompanying drawings.

First Embodiment

Figure 1:
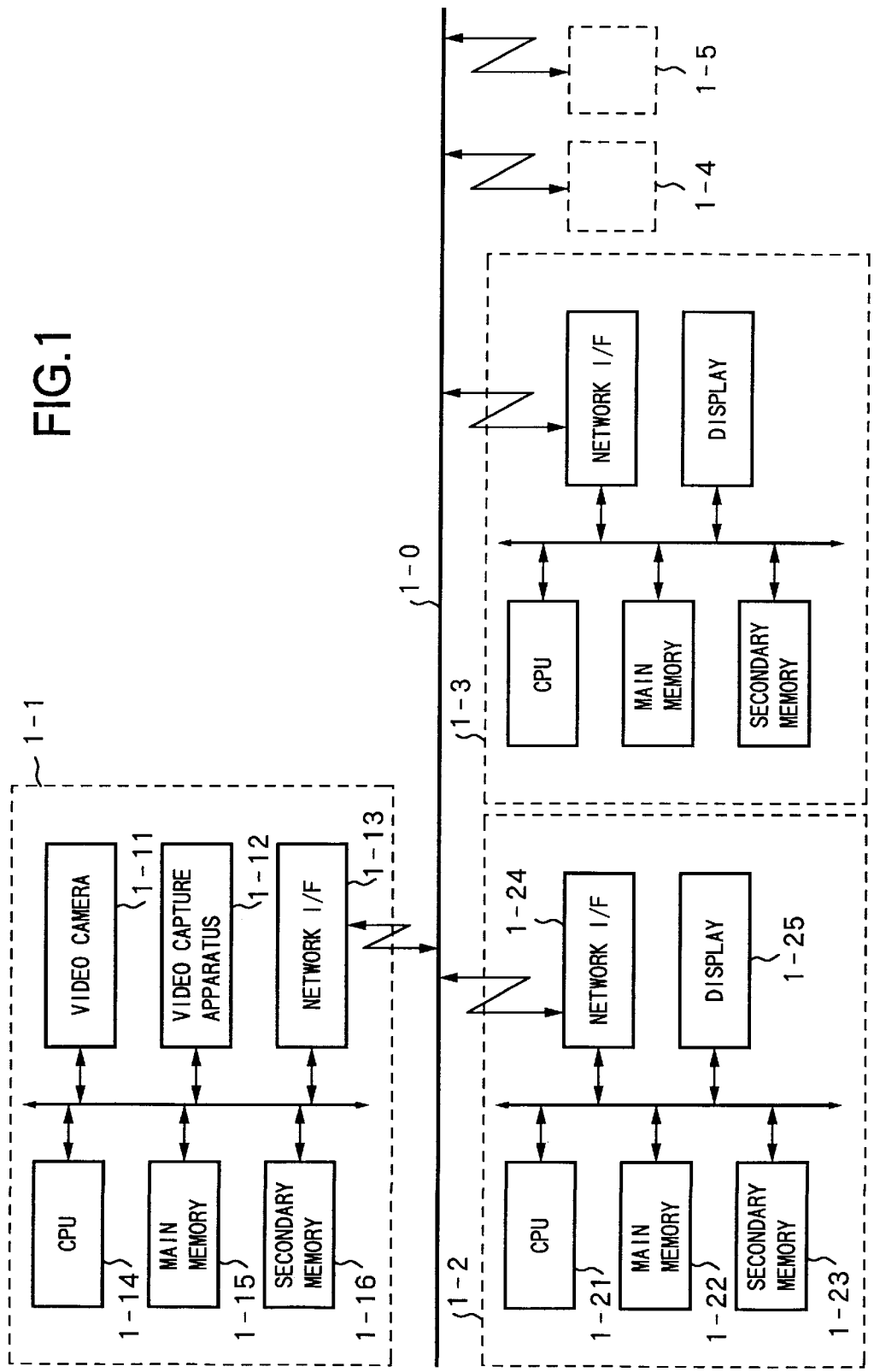
FIG. 1 is a block diagram showing a camera system according to the first embodiment.

FIG. 1 is a block diagram showing connection relation between a camera server apparatus and a client apparatus, and respective construction according to the first embodiment.

In FIG. 1, reference numeral 1-1 denotes a camera server apparatus; and 1-2, 1-3, 1-4 and 1-5 denote client apparatuses. The camera server apparatus 1-1 captures an image sensed by a video camera and transmits the image to a client apparatus who is connected at the time with the camera server apparatus. Each client can receive and display the image transmitted by the camera server apparatus. Theoretically, it is assumed that the number of clients is not limited. The camera server apparatus is applicable in a network, e.g. Internet, where an unspecified number of users may become clients. Note that, as mentioned above, the speed at which the camera server apparatus captures an image is limited, and the number of client apparatuses who can connect with the server apparatus at once is limited due to the limited transmission bandwidth in the network.

The camera server apparatus 1-1 is constructed with: a video camera 1-11, a video capture apparatus 1-12 which captures an image sensed by a video camera, a network interface 1-13 which transmits the captured image to a network 1-0, a CPU 1-14 which controls the aforementioned modules, a main memory 1-15, and a secondary memory 1-16 which stores access data.

The video capture apparatus 1-12 captures an NTSC signal indicative of an image sensed by the video camera, compresses the signal according to Motion JPEG upon performing A/D conversion, and sends the compressed data to the network interface. Although the image compression method utilized herein is Motion JPEG, the present embodiment is not limited to this compression form. In addition, the rate at which frames of an image are transmitted is not specifically defined. It is to be understood that image signals are captured and transmitted at a rate within a permissible range of the speed of the network, CPU and so on, and within a permissible range of image capturing speed by the video camera.

Since the basic construction and operation of the client apparatuses 1-2, 1-3, 1-4 and 1-5 are the same, description will be provided herein only on the client apparatus 1-2.

The compressed image data transmitted by the camera server apparatus 1-1 via the network 1-0 is received by a network interface 1-24, expanded by a CPU 1-21 and displayed on a bit-map display 1-25. In the client apparatus 1-2, for instance, a window system is operated, and the expanded image data is displayed in the window form on the display 1-25.

Processing of the CPU 1-14 in the camera server apparatus 1-1 is realized by an access management module and an image transmission module. The access management module determines the number of client apparatuses to which an image is transmitted, and determines whether or not the number exceeds the permissible number of communication in the communication line when a new access request is received. In addition, the access management module stores access history information (the number of transmission and accesses rejected in the past). The image transmission module transmits image data to the client apparatus who is connected to the camera server apparatus. Meanwhile, the client apparatus is configured by an access request module and an image display module.

Figure 2:
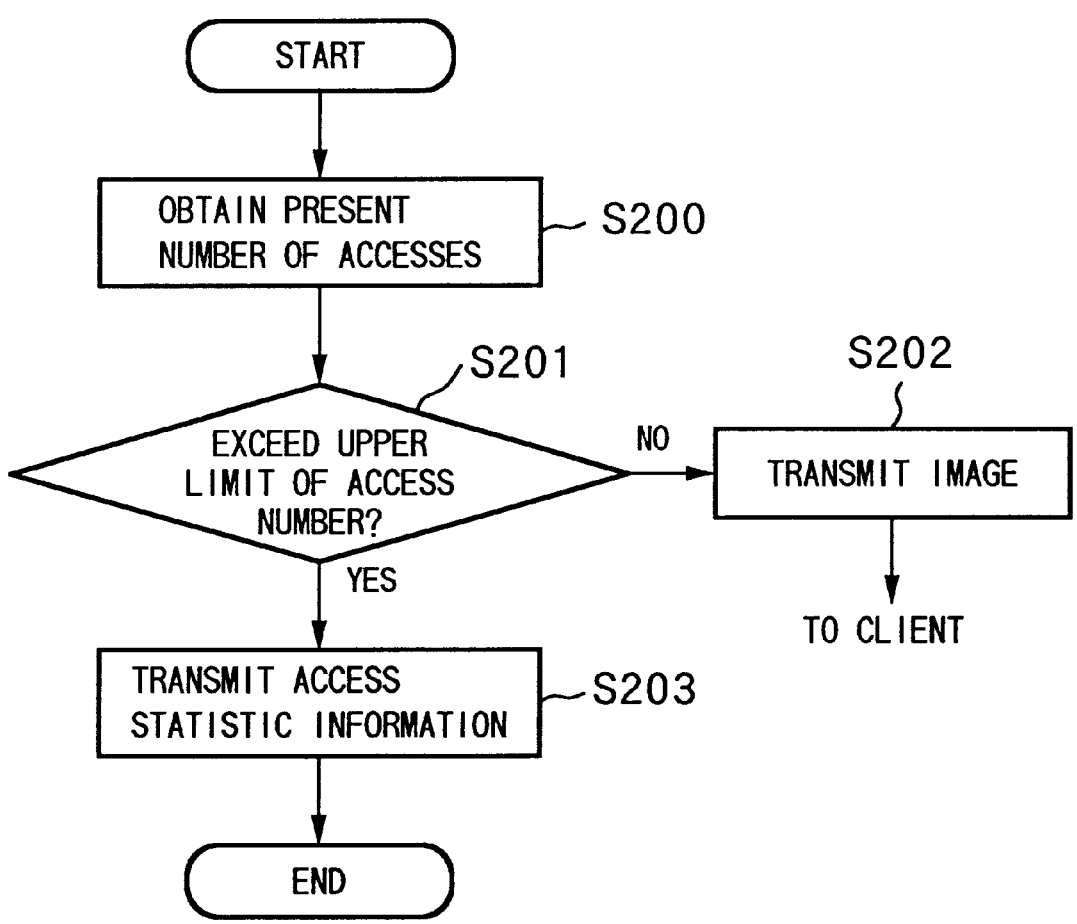
FIG. 2 is a flowchart showing a part of processing performed by a camera server according to the first embodiment.

Operation of the camera server apparatus and client apparatus in a case where the client apparatus sends an access request to receive an image sensed by the video camera, will be shown in FIGS. 2 and 3.

When the camera server apparatus receives an access request from a client to receive an image sensed by a video camera, the access management module obtains the present number of accesses (step S200). In the access management module, an upper limit is set for the number of accesses in correspondence with the capacity of the communication line. Upon receiving a new access request, the access management module determines whether or not the number of accesses exceeds the upper limit (S201). The upper limit value is predetermined and stored in the secondary memory 1-16.

In a case where the number of accesses does not exceed the upper limit, the image transmission module transmits the image to the client apparatus (step S202). In a case where the number of accesses exceeds the upper limit, the access request is rejected, and access statistic information is transmitted to the client apparatus, instead of the image sensed by the video camera (step S203). Herein, the access statistic information is: the number of clients presently connected to the camera server apparatus, the number of accesses recently rejected, and the access permission probability (the number of accesses permitted/the number of access requests). To determine the number of accesses recently rejected and the access permission probability, for instance, data obtained in the last five minutes is utilized.

In this case, the camera server apparatus stores data related to the time at which an access request is received and whether the access request is rejected or permitted. The data which is older than the last five minutes may be deleted.

Meanwhile, the processing by the client apparatus is as follows.

Upon transmitting an access request to the camera server apparatus (step S300), the client apparatus awaits for a response from the camera server apparatus (step S301). If data transmitted by the camera server apparatus is image data, the image display module expands compressed image data and displays the expanded data in the window of the bit-map display (steps S302 and S303). If data transmitted by the camera server apparatus is access statistic information, the information is displayed in a dialogue (steps S302 and S304).

The client apparatus displays access statistic information as shown in FIG. 4. The number of present accesses, the number of accesses rejected in the last five minutes, and access probability are displayed in the dialogue. Although the above information is expressed by numerical values, a bar graph or the like may be used.

By virtue of the access statistic information, a user, whose access request has been rejected, is able to know the volume of traffic on the camera server apparatus. Therefore, the user can be provided with a hint for the next action as to whether to wait for a while and re-send an access request later, or to give up sending the access request for the moment.

Second Embodiment

In the second embodiment, access statistic information which is more detailed than that of the first embodiment is presented to a user so that the user is able to obtain clear suggestion for re-accessing.

The process flow of the camera server apparatus and client apparatus in a case where the client apparatus transmits a request to receive an image, is the same as that of the first embodiment. According to the second embodiment, in a case where the camera server apparatus rejects an access request, access statistic information indicative of a varying state of the number of accesses throughout a day, is sent to the client apparatus. More specifically, the sum of the number of client apparatuses who are presently receiving an image from the camera server apparatus and the number of accesses permitted and rejected in a predetermined time period (e.g. ten minutes) is determined as the number of accesses, and the number of accesses counted throughout a day is transmitted to the client apparatus as numerical value data, along with time data.

FIG. 6 shows a table for managing access states of the camera server apparatus for entire day. As shown in FIG. 6, the number of accesses, the number of accesses rejected and the number of accesses permitted are counted for every ten minutes; the counted values are written in a row corresponding to real time; and the processing proceeds to the next row. The data written in the next row of (the one below) the arrow "present time" is actually the data from a previous day. Note that time data is not included because each data corresponds to a ten-minute period and the entire data corresponds to twenty-four hours. Therefore, time for each data can be obtained based on the present time.

When a transferred access request is rejected, the data shown in FIG. 6 is transferred to the client apparatus. The data is transferred in the sequence indicated by the arrow 60 in FIG. 6. In other words, old data is transferred first (or, new data may be transferred first). Note that, at this stage, time and date of the data is added to the first data (or may be the last data).

The client apparatus provides a user with the access statistic information, transmitted upon rejection of the access request, by displaying the information in a graph. A display example thereof is shown in FIG. 5. In FIG. 5, the abscissa denotes time and the ordinate denotes the number of accesses. The permissible number of accesses in the camera server apparatus is also displayed in the graph. The time period, in which the number of accesses largely exceeds the permissible number of accesses, indicates that the possibility of an access request being accepted is low. Note that exceeding "the permissible number of accesses" does not mean that an access request will be always rejected because the data is ten minutes old. More specifically, there is always a possibility where a user of a client apparatus who has been receiving images from the server has quit the connection. The data shown in FIG. 6 is merely the information obtained at ten minutes intervals.

According to the second embodiment, when an access request to view an image sensed by a video camera is rejected, statistic information for the entire day is displayed. Therefore, a trend of the time at which the camera server apparatus is available and the time at which the camera server apparatus is busy become apparent, enabling a user to obtain a clear hint for determining timing for the next access.

Note that the second embodiment has been described based on an assumption that the data, indicative of access states of the past twenty-four hours, is stored. However, as long as the storage capacity of the secondary memory 1-16 allows, the data storing time period is not limited to this, but may be a week, month or more.

In addition, the time interval for updating data is not limited to ten minutes, but may be five minutes, twenty minutes or more. However, in order to respond to various requests, such as for access history information of the past one day or information of the last thirty days, it is necessary to store detailed data. If access history information updated at short time intervals is stored, it is possible to respond to a request from a client apparatus who wants to have the access history of longer time intervals. However, if access history information updated at large time intervals is stored, it is not possible to respond to a request from a client apparatus who wants to have the access history of shorter time intervals.

Third Embodiment

In the foregoing first and second embodiments, description has been provided on the processing performed when an access request to receive an image sensed by a video camera is rejected. The third embodiment applies the system described in the first and second embodiments to a system which allows a large number of client apparatuses located in remote places to control parameters of a video camera e.g. pan, tilt and zoom.

When one video camera is provided, normally the number of users who can control the video camera at the same time is a single user. (Hereinafter, the user who is presently controlling the video camera will be referred to as "a user who has the control privilege.") Therefore, if a large number of client apparatuses send camera control requests, for those users who send a camera control request after the first user has sent one, the camera control request is rejected or the request is inputted in a waiting queue in the order of the request being received. Even in a case where the camera control requests are inputted in the waiting queue, the number of requests which can be stored in the queue is limited. Therefore, if the number of access requests is larger than the queue limitation, a newly received access request is rejected.

In the third embodiment, the sum of the number of client apparatuses stored in the camera control waiting queue and the number of accesses rejected in a predetermined time period is determined as the number of accesses, and the number of accesses counted throughout a day is transmitted to the client as numerical value data, along with time data.

The client apparatus provides a user with the access statistic information, transmitted upon rejection of a camera control request (an image sensed by the video camera has been already transferred), by displaying the information in a graph as described above with reference to the second embodiment. The display example is almost the same as that shown in FIG. 5, except that the permissible number of data in a waiting queue is displayed as the permissible number of accesses. The time period, in which the number of accesses largely exceeds the permissible number of accesses, indicates that the possibility of a camera control request being accepted is low. During the time period in which the number of accesses is low, the possibility of a camera control request being accepted is relatively high.

As described above, even when requesting a camera control privilege, a user is able to know the trend of the time at which the camera server apparatus is available and the time at which the camera server apparatus is busy, by displaying statistic information obtained throughout a day. Accordingly, the user is able to obtain a clear hint for determining timing for the next access.

Note that in the foregoing embodiments, the display examples shown in FIGS. 4 and 5 are displayed on the client apparatus when an access request transmitted to the camera server apparatus is rejected. However, for instance, a user who is already connected to the camera server apparatus and is presently viewing the image sensed by the video camera, may also desire to know the access states of the camera server apparatus. Without the access state information, the user cannot determine whether the user's camera control request has been accepted by chance among many other access requests or it has been accepted because there were not many access requests; thus, the user cannot obtain a hint for the next access.

Therefore, even for the client apparatus who is presently receiving images from the camera server apparatus, it is preferable to have means to obtain the access state information.

FIG. 7 shows a window displayed when a browser program is operated on the client apparatus. The drawing shows that the client apparatus is connected to the camera server apparatus (the address (URL) thereof is "///www.foo.co.jp/")

Reference numeral 71 denotes a maximum image sensing field of view; 72, a present image sensing field of view; 73, a scroll bar for controlling a tilt angle; 74, a scroll bar for controlling a pan angle; and 80, a bar for controlling a zoom value. Note that when the user is not provided with a camera control privilege, the bars for controlling the angles do not function (to clearly show this, these bars are displayed in gray).

Reference numeral 75 denotes a frame where an image transmitted from the camera server apparatus is displayed. An image, sensed from the angle set by the user who has the camera control privilege, is displayed in the frame. Note that since image data is transmitted from the camera server apparatus in a compressed form, the client apparatus internally performs expansion processing on the compressed data and display.

Herein, when a cursor synchronized with a pointing device is moved to an access state button 76 in FIG. 7 and when the button on the pointing device is depressed at that position, the control command indicative of an access state request is transferred to the connected camera server apparatus.

Since FIG. 7 is shown taking Internet as an example, the transfer command must also be transferred according to the Internet standard. Therefore, when the access state button 76 is designated, for instance, the following character string is transferred to the camera server apparatus:

///www.foo.co.jp/get.status

Normally, the above description is utilized as a file transfer request. However, the camera server apparatus interprets a character string, which follows its own address, as a command. In this interpretation, if the camera server apparatus determines that the character string is a reserved word, data is transferred to the client apparatus to make the client display the window or graph shown in FIG. 4 or 5. Note that, instead of transferring numeric character data, image data as that shown in FIG. 5 may be generated and transmitted to the client apparatus as similar to the transmission of images, thereby displaying the state information in the frame 75 in FIG. 7.

As described above, according to the second and third embodiments, in the system which allows a large number of users to access a camera on the network, statistic information regarding the past access state is provided to a user whose access request has been rejected. Therefore, a user is able to obtain a hint for determining timing to send the next access request.

In addition, upon rejection of an access request the data transmitted from the camera server apparatus to the client apparatus is numerical value data. Based on the numerical value data, the client apparatus can generate a graph or the like to be displayed. Thus, data transmission requires only a small bandwidth, and furthermore, data is presented to the user in a user-friendly manner.

As set forth above, according to the first, second and third embodiments, a client apparatus is able to obtain access state information on the desired camera server apparatus.

Fourth Embodiment

Description will now be provided on an application of the present invention to a remote image service system as the fourth embodiment, which utilizes Internet as a network.

The remote image service system broadcasts moving picture data by utilizing a computer network. Users are able to view the broadcast moving picture by starting a special viewer software. Moving picture data to be broadcast is obtained by converting an image sensed by a video camera or an image recorded on a video tape or the like into a moving-picture data format such as Motion JPEG, MPEG or the like. The remote image service system is constructed by main server, relay server and a client, as similar to a service system operating on a general network having a large scale.

Figure 8:
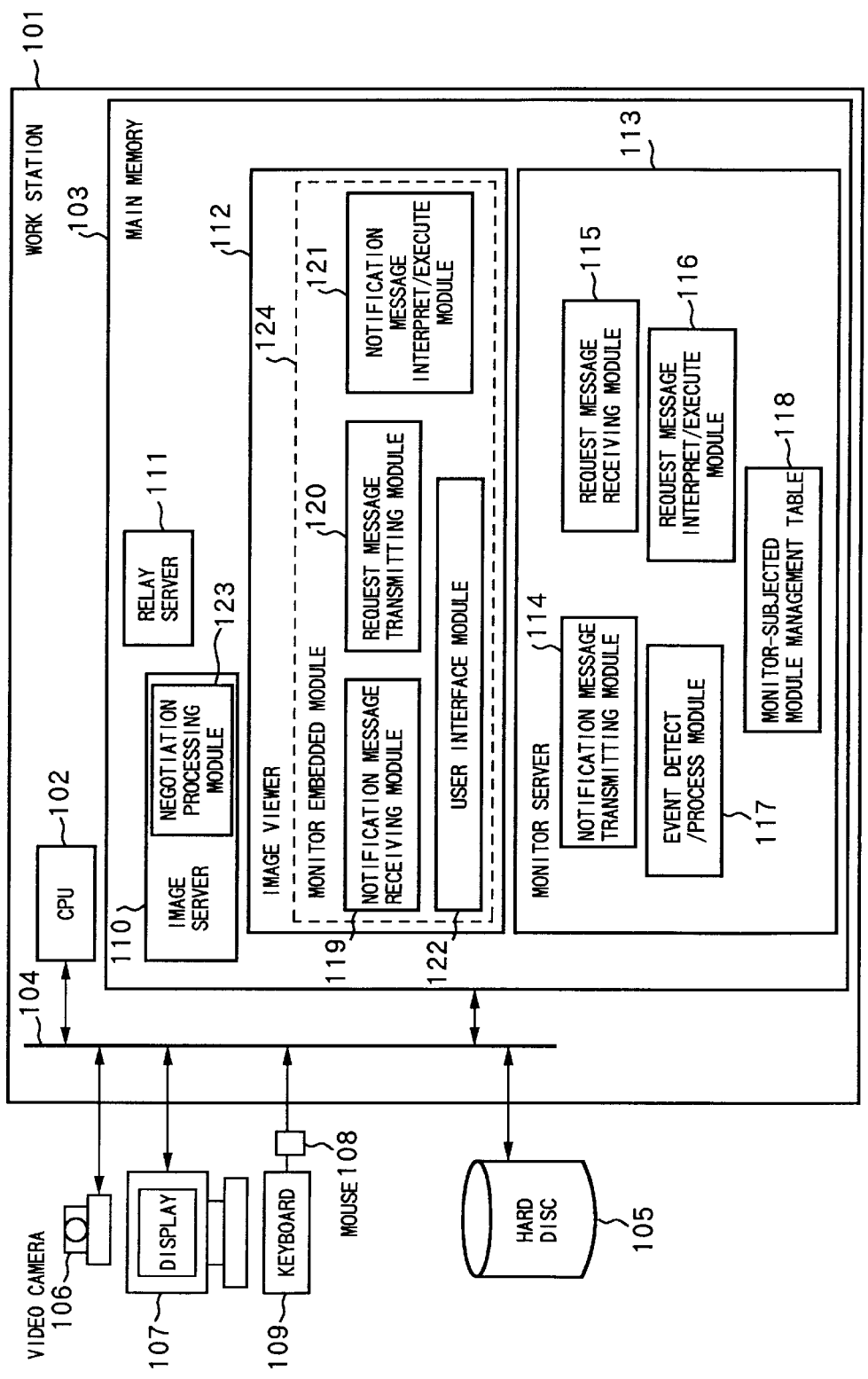
FIG. 8 is a block diagram showing a construction of a remote image service system according to the fourth embodiment.

FIG. 8 is a block diagram showing a construction of the remote image service system according to the fourth embodiment. In the remote image service system, a service monitor system, which is one of embodiments of the present invention, is applied.

Referring to FIG. 8, a work station 101 is realized by connecting a CPU 102, which executes processing of the fourth embodiment, with a main memory 103, which stores a primary software group (110, 111, 112, 113) used in the fourth embodiment, via a computer bus 104. In addition, hard disk 105 serving as a secondary memory for storing programs for the software group (110, 111, 112, 113) in the main memory 103, a video camera 106 for inputting/ outputting an image, display 107, keyboard 108 and a mouse 109 are also connected to the work station 101 via a respective interface.

An image server 110 is a main server in the remote image service system. The software performs conversion of a video signal obtained from the video camera 106 into moving picture data, and broadcasts the moving picture data to a computer network or the like.

A relay server 111 receives the moving picture data from the image server 110 and relays the data to other relay servers and an image viewer 112. The main function of the relay server 110 is to convert quality of the moving picture data (frame rate, image size, the number of colors) in accordance with a request from the image viewer 112.

The image viewer 112 serves as a client when a user views broadcast moving picture data. The image viewer 112 directly receives moving picture data from the image server 110, or receives moving picture data via the relay server 111 and displays the contents of the moving picture data on the display 107.

A monitor server 113 is provided as an independent server program and serves as operation state monitoring means in the remote image service system. The monitor server 113 collects operation state information of the image server 110, relay server 111 and image viewer 112 (these are the modules subjected to monitoring by the monitor server 113, and hereinafter referred to as a "monitor-subjected module") and performs appropriate processing when a problem occurs.

Note that although the above software group (110, 111, 112, 113) operates on the same host computer, in reality, each of the software operates on different host computers in many cases. In this case, each host computer must be able to communicate with one another via a computer network.

Figure 9:
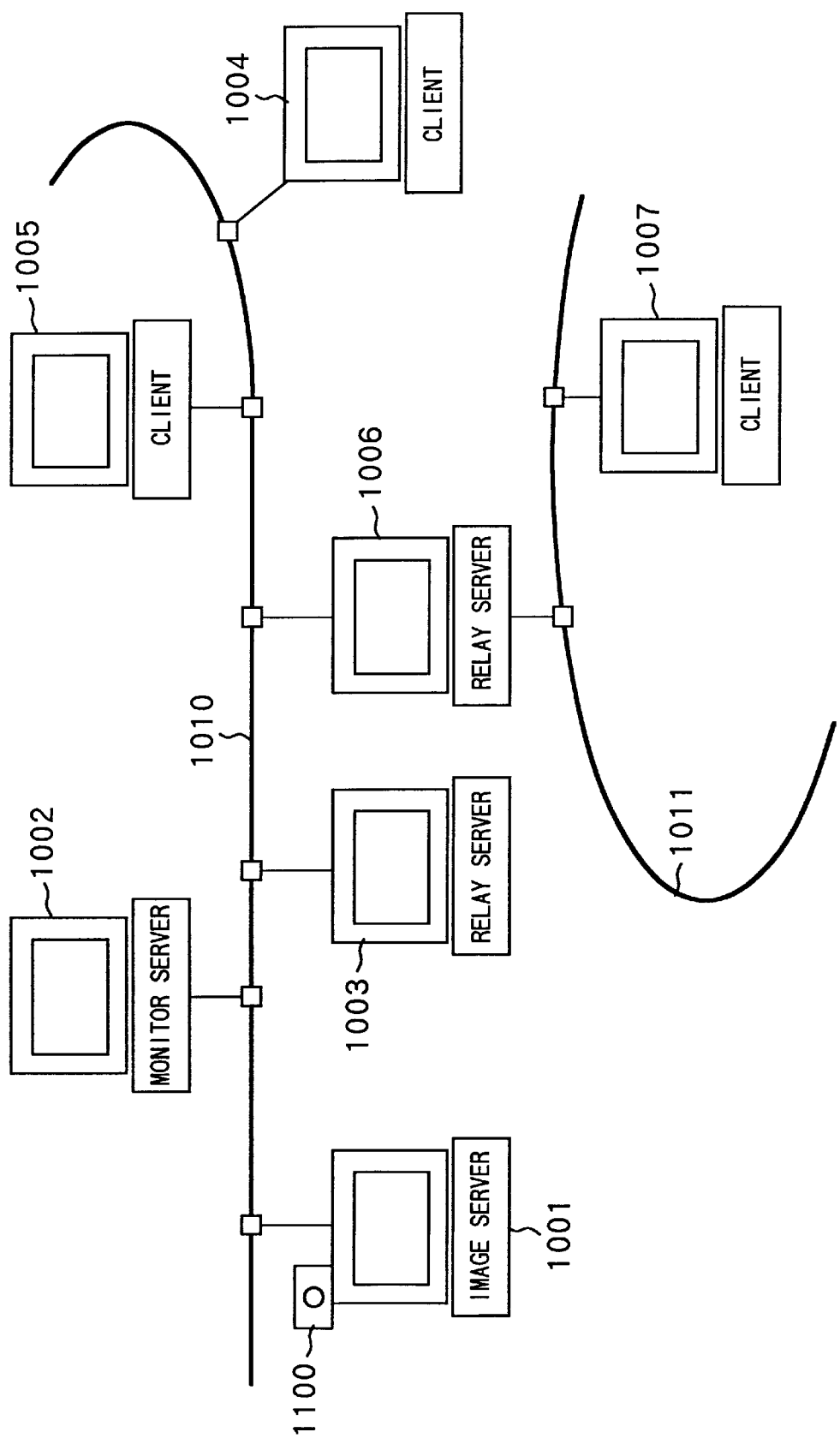
FIG. 9 is a diagram showing a state where independent computers connected via network realize an image server, relay server and a client (image viewer)

FIG. 9 is a diagram showing a state where each of the software group is realized by different computers. In FIG. 9, a computer 1001 realizes the image server 110. An image sensed by a camera 1100 is transmitted to the relay server or clients via the network 1010, 1011 and the like. A computer 1002 realizes the monitor server 113. Computers 1003 and 1006 realize the relay server 111. Each of the computers 1004, 1005 and 1007 realizes the image viewer 112.

Note that the method and operation of the present embodiment described below has no difference in a case of utilizing a computer network and a case of not using the network. Therefore, the description is provided based on the configuration in FIG. 8.

Note that it is possible to structure the configuration of FIG. 8 to enable remote operation of the video camera 106 for changing the posture (pan, tilt) or zoom values of the video camera. More specifically, in FIG. 9, posture or zoom values of the camera 1100 of the image server 1001 can be changed by the computers 1004, 1005 and 1007.

[Configuration of Monitor Server 113]

The monitor server 113 is configured by the following internal software modules.

i) Notification Message Transmitting Module 114

A notification message transmitting module 114 is used when the monitor server 113 transmits a "notification message" to the monitor-subjected modules (110, 111, 112). Note that the notification message is transmitted mainly for transferring information related to the operation state of each monitor-subjected module collected by the monitor server 113.

The monitor-subjected module performs respective processing by utilizing information added to the notification message. For instance, the image viewer 112 is able to perform processing such as displaying a message or the like for a user to notify the operation state of the image server 110, relay server 111 and the like. Details of the notification message will be described later.

ii) Request Message Receiving Module 115

A request message receiving module 115 receives a "request message" transmitted by the monitor-subjected module (110, 111, 112). The monitor-subjected module is able to obtain information related to operation confirmation or operation state of a program by transmitting a request message to the monitor server.

iii) Monitor-SubjectedModule Management Table 118

The request message receiving module 115 and notification message transmitting module 114 are realized by utilizing a data communication mechanism provided by a general operating system. Information such as an address, port number and the like, necessary for performing data communication between modules is managed by the monitor-subjected module management table 118. The monitor-subjected module management table 118 is realized by utilizing a general simple database management mechanism such as hashing or the like. A database system such as a full-scale relational database or the like may also be utilized. Note that although this module is not an essential component of the present invention, it is necessary to construct the present embodiment.

iv) Request Message Interpret/Execute Module 116

A request message interpret/execute module 116 interprets a request message transmitted to the monitor server 113 and executes corresponding processing. The detailed operation of the request message interpret/execute module 116 will be described later.

v) Event Detect/Process Module 117

An event detect/process module 117 detects and identifies an "event" detected when processing a request message or a notification message, and handles the detected "event." Herein, the "event" represents various problems occurred in the monitor-subjected module. Detailed operation of the event detect/process module 117 will be described later.

[Configuration of Monitor-Subjected Module]

Each of the monitor-subjected modules comprises a monitor-embedded module 124. Although the monitor-embedded module 124 is shown only inside the image viewer 112 in FIG. 8, the similar module is included also in the relay server 111 and image server 110. That is, all the monitor-subjected modules (110, 111, 112) include the monitor-embedded module 124 in order to utilize the monitoring function provided by the monitor server 113. The monitor-embedded module 124 is provided as a library routine which is incorporated at the time of generating each monitor-subjected program. The monitor-embedded module 124 is configured by the following modules.

i) Notification Message Receiving Module 119

A notification message receiving module 119 receives a notification message transmitted by the monitor server 113. The received notification message is transferred to a notification message interpret/execute module 121.

ii) Request Message Transmitting Module 120

A request message transmitting module 120 generates and transmits a request message to be transmitted to the monitor server 113. The request message transmitting module 120 and notification message receiving module 119 can be realized by utilizing the well-known data communication mechanism. Details on what kind of request messages are to be used will be described later.

iii) Notification Message Interpret/Execute Module 121

A notification message interpret/execute module 121 interprets the notification message and extracts information added to the message. Processing is performed on the basis of the added information. For instance, an image viewer is able to perform processing such as displaying information in a graph, temporarily stopping image data reception, or displaying an error message.

Note that contents of the processing performed in response to a notification message must be decided upon its generation for each of the monitor-subjected modules, and must be embedded in the program of each monitor-subjected module.

Furthermore, a negotiation processing module 123 is added to the monitor-embedded module incorporated in the image server 110. The negotiation processing module 123 defines items and events to be monitored by the monitor server 110 and designates a kind of information to be added to the notification message or request message.

Moreover, a user interface module 122 is added to the monitor-embedded module 124 which is incorporated in the image viewer 112. The user interface module 122 is a module for graphically displaying information regarding operation of the entire remote image service. The user interface module 122 is controlled by the notification message interpret/execute module 121.

Figure 10:
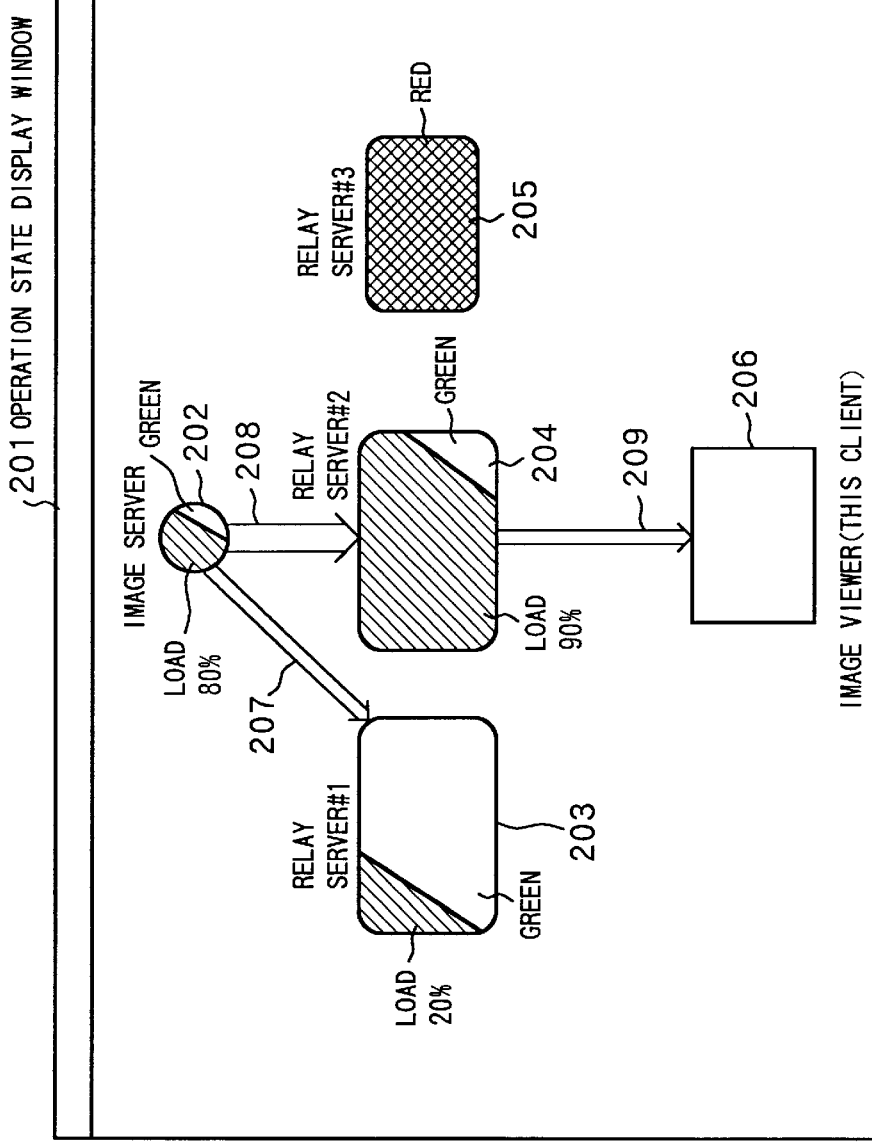
FIG. 10 is a display example of an interface "operation state display window" provided by a user interface module.

FIG. 10 shows a display example of an interface "operation state display window 201," provided by the user interface module 122.

In the operation state display window, relationship of the image server 110, relay server 111 and image viewer 112 is graphically displayed. An operation state of each module (image server, relay server and so on) is expressed by the dark portion (hatched portion in FIG. 10) of the figures (202, 203 204, 205) indicative of respective modules. In the example in FIG. 10, the larger the dark portion, the larger the load is added to the module.

Furthermore, the thickness of arrows connecting between the modules (202, 203, 204, 206) indicates the amount of data transmitted between the modules. In the example in FIG. 10, the thicker the arrow, the larger the amount of data.

Moreover, the figures indicative of respective modules are colored by red/green/yellow, each indicating the followings:

green indicates that the module is normally operated;

red indicates that the module is stopped due to a trouble; and yellow indicates that the operation state is unknown. Note that in FIG. 10, the colors are named for descriptive convenience.

Note that the operation state display window 201 according to the fourth embodiment is provided as a part (user interface module 122) of the monitor-embedded module 124. However, this portion may be realized as an independent program (operation state display window program). In this case, the operation state display window program is started together with the image viewer and operated in the same environment.

Moreover, such operation state display window program functions as an intermediate process for message transmission between the monitor server and the image viewer.

The user interface according to the fourth embodiment not only monitors the operation state of the system, but also serves as a user interface for modifying the operation state. For instance, if a user operates the size of the dark portion and the thickness of the arrow, the operation is converted to a request message by a request message transmitting module 120. The request message is transmitted via the monitor server 113 and is notified to the relay server 111 and image server 110, then parameters which determine each operation state are modified.

[Monitor Protocol]

Hereinafter, description will be provided on a communication protocol used between the monitor server 113 and monitor-subjected module (110, 111, 112). The communication protocol according to the fourth embodiment is constituted with the following three kinds of messages:

i) negotiation message;

ii) notification message; and iii) request message.

In the following description, a message is written in the following form:

[name of message] [name of additional information]= [value][name of additional information]=[value]. . . Herein, ". . . " indicates repetition of the same item (herein, [name of additional information]=[value] is repeated).

For instance, an operation confirmation request message of an image server A is written as follows:

do-ping to="image server A"timeout=1000 msec Hereinafter, description will be provided on each message.

i) Negotiation Message

A negotiation message is used for negotiation process between the monitor server 113 and monitor-subjected module for determining an "event" which indicates occurrence of a request message and/or a notification message or occurrence of a problem. Strictly speaking, a negotiation message is a type of a request message, and is transferred between the request message transmitting module 120 and request message receiving module 115. In the negotiation process, the following negotiation messages are used.

(1) Event Define Message

An event define message defines an "event" indicative of problem occurrence such as stop of the image server 110. When the message is transmitted to the monitor server, the event is defined. The message is written in the following form:

define-eventname=[name of event]type=[type of event] [name of additional information]=([type of additional information], [type information]. . . ) . . .

Herein, "name of event" is the name of the event to be defined. "Type of event" is a rough classification of events and is defined by the following three categories:

a) problem: event indicative of a problem;

b) periodical notification: event which forces to transmit a periodical notification, and is also called as a timer event;

c) non-periodical notification: event which does not belong to neither "problem" or "periodical notification".

Furthermore, as the "type of additional information," the following four types may be specified:

d) character string—character string: an initial value is specified as type information. For instance:
Message=(character string, "event occurred")

e) integer value—integer value: an initial value, minimum value and maximum value are specified as type information. For instance:
SAMPLENUMBER=(integer, 0, −100, 100)

f) real number value—real number value: an initial value, minimum value and maximum value are specified as type information. For instance:

SAMPLEVALUE=(real number value, 0.5, −10.99, 100.0)

g) time—time: if "present time" is specified as type information, time at which an event occurred is given as type information. For instance:

Time=(time, "TueNov1918:31:03JST1996")

(2) Event Processing Define Message

An event processing define message defines processing to be executed by the monitor server 113 when an event occurs. The message is written in the following form:

define-event-handler name=[name of event]¥{ [notification message description]. . . ¥}

Note that as can be seen from the description, the processing performed by the monitor server 113 at the time of event occurrence is only to transmit a notification message to each monitor-subjected module.

In addition, "notification message description" specified herein is written in the following form:

[notification message label] [name of notification message] [name of additional information]=[value of additional information]. . .

The "notification message label" is used to label the notification message description in the event processing define message. This item may be omitted. In addition, "value of additional information" is written in the following manner, utilizing results of an already-defined event definition or other notification messages:

[name of event]. [name of additional information]

[notification message label]. [name of additional information]

An example of description is as follows:

"crucial problem of image server A". "time occurred"

(3) Event Occurrence Condition Define Message

An event occurrence condition define message defines a condition of event occurrence. The message is written in the following form:

define-event-condition name=[name of event] ([notification message pattern], [notification message condition]. . . ) . . .

When a result of notification message matching the "notification message pattern" satisfies the notification message condition stated in the same parentheses, event occurrence is determined. The notification message pattern is written in the same form as a notification message description, which will be described later.

Note that a notification message pattern is written in the following form:

[name of additional information]=[value of additional information]

A notification message which coincides with the foregoing "value of additional information" is considered that it matches with the foregoing notification message pattern. The following is given as an example of the notification message pattern: notice-want-info target="image server A" about="number of clients"

Furthermore, the "notification message condition" specifies a condition of event occurrence and is written in the following form:

[name of additional information]=[value of additional information]

[name of additional information]=[lower limit value of additional information]–[upper limit value of additional information]

Note that the [value of additional information] or the range of [lower limit value of additional information]–[upper limit value of additional information] specified in the above description are applied to a result of the notification message. However, events specified by the above form are only the "problem" event and "non-periodical notification" event.

The "periodical notification" event is specified in the following form:

define-event-condition name=[name of event]interval-time=[interval time]

A unit of the "interval time" is msec. An event occurs at the specified intervals. For instance, an event will occur every sixty seconds if description is written as follows:

define-event-condition name=periodical message interval-time=60000

(4) Event Definition Obtain Message

Information regarding the defined events can be obtained from the monitor server by utilizing the following messages:

a) get-event-list: names of all the defined events can be obtained;

b) get-event-definition name=name of event: event definition of the specified name, event occurrence condition and event processing, can be obtained.

ii) Notification Message

As a notification message, the following five messages are defined in advance.

(1) Operation Confirmation Notifying Message

An operation confirmation notifying message is a notification for confirming operation of the monitor-subjected module. The monitor-subjected module which receives the notifying message must return a request reply message. The message is described in the following form:

notice-ping (2) Operation State Obtain Notifying Message

An operation state obtain notifying message is a notification for obtaining information related to a operation state of the monitor-subjected module. The message is described in the following form:

notice-want-info target=[name of module subjected to operation confirmation]about=[operationstate information name]

The following is given as an example: notice-want-info target="image server A"about="number of clients"

(3) Event Notifying Message

An event notifying message is a message which notifies the monitor-subjected module of event occurrence. The message is written in the following form:

notice-event name=[name of event]target=[receiver] [information related to event]. . .

Herein, "information related to event" is specified when the event is defined. In addition, for the "notice-event", the description "all-[client-type]" can be used as a target value of the notification message. Herein, "client-type" is one of the character strings: "main-server", "proxy-server" or "client". If the description is specified, the notification message can be transmitted to all monitor-subjected modules which belong to "client-type".

(4) Request Reply Message

A request reply message is a special notification message used to reply to a request message transmitted by the monitor server. The message is written in the following form:

reply-request for=[request message ID] [name of additional information]=[value]. . .

Note that the "request message ID" is a unique identifier automatically allocated to a request message. The request reply message is, for instance, described as follows:

reply-request for="Request-100" "number of clients"= "1000"

(5) Parameter Setting Message

A parameter setting message is a notification used to instructs the monitor-subjected module of parameter setting. The message is written in the following form:

notice-set-parameter target=[name of module subjected to operation confirmation] [parameter name to be set]= [value]. . .

The parameter setting message is utilized as a parameter name to be set in a case where an operation state of the monitor-subjected module is to be modified by specifying an occupying rate of the CPU or an amount of image data, as will be described later.

iii) Request Message

As a request message, the following six messages are defined in advance.

(1) Monitor-Subjected Module Register Message

A monitor-subjected module register message is used to register a monitor-subjected module, which becomes a client of the monitor server, in the monitor-subjected module management table. As additional information, an address, port number and the like which are necessary for data communication among modules are added. To the registered monitor-subjected module, a unique client ID is allocated. The client ID is added to a reply notification message in response to the monitor-subjected module register message and the message is returned to the monitor-subjected module. The message is written in the following form:

req-register type=[type of monitor-subjected module] name=[name of module] addr=[address] port=[port number]

Herein, in the "type of monitor-subjected module", the following four values can be specified:

monitor-server main-server proxy-server client

The value indicates that the type of the monitor-subjected module is, respectively: the monitor server, main server, relay server and client.

Moreover, "name of module" is a name of a monitor-subjected module which is to be registered, and the "address" and "port number" are respectively an IP address and the port number to be used for data communication.

An example of the monitor-subjected module register message is as follows: req-register type="main-server"name="image server A"addr= "192.168.111.111"port="123456"

(2) Monitor-Subjected Module Registration Delete Message

A monitor-subjected module registration delete message deletes a registration from the monitor-subjected module management module. The message is written in the following form:

req-un-register client-ID=[client ID]

An example of the monitor-subjected module registration delete message is as follows:

un-register client-ID="10"

(3) Operation Confirmation Request Message

An operation confirmation request message requests a confirmation process of confirming whether or not other monitor-subjected modules are operated. The message is used in the following form: req-ping target=[name of module subjected to operation confirmation]

An example of the operation confirmation request message is as follows: req-ping target="image server A"

(4) Operation State Obtain Request Message

An operation state obtain request message requests to obtain information related to operation states of other monitor-subjected modules. The message is written in the following form:

req-want-info target=[name of module subjected to operation confirmation]about=[operationstate information name]

Note that the result is returned by adding the current value of the operation state information name designated by "about" to the reply notification message. An example of the operation state obtain request message is as follows:

req-want-info target="image server A"about="number of clients"

(5) Notification Reply Message

A notification reply message is a special request message for responding to a notification message transmitted by the monitor server. The message is written in the following form:

reply-notice for=[notification message ID] [additional information name]=[value]. . .

The "notification message ID" is a unique identifier automatically allocated to a notification message by the notification message transmitting module. An example of the notification reply message is as follows:

reply-notice for="Notice-100""number of clients"= "1000"

(6) Parameter Setting Request Message

A parameter setting request message is a request used when one monitor-subjected module instructs parameter setting to another monitor-subjected module. The message is written in the following form:

req-set-parameter target=[name of module subjected to operation confirmation][name of parameter to be set]= [value]. . .

The parameter setting request message is utilized as a parameter name to be set in a case where an operation state of the monitor-subjected module is to be changed by specifying an occupying rate of the CPU or an amount of image data, as will be described later.

Hereinafter, description will be provided on operation of the fourth embodiment realized by the foregoing module configuration and protocol. Note that the following description will be given based on an assumption that the monitor server 113 only is initially started, then the image server 110, relay server 111 and image viewer 112 are subsequently started.

Figure 12:
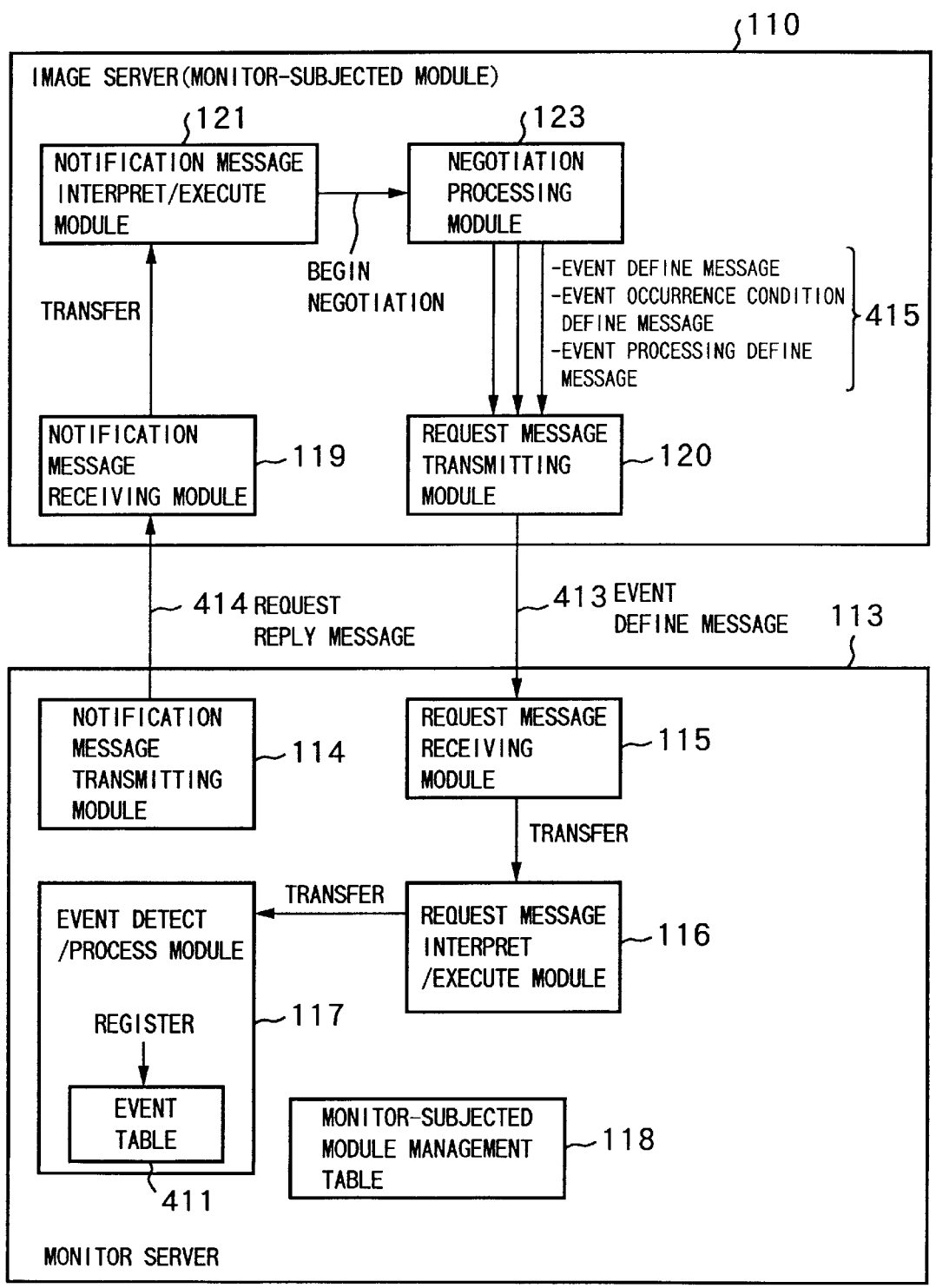
FIG. 12 is an explanatory diagram for negotiation processing between the image server and monitor server.
Figure 13:
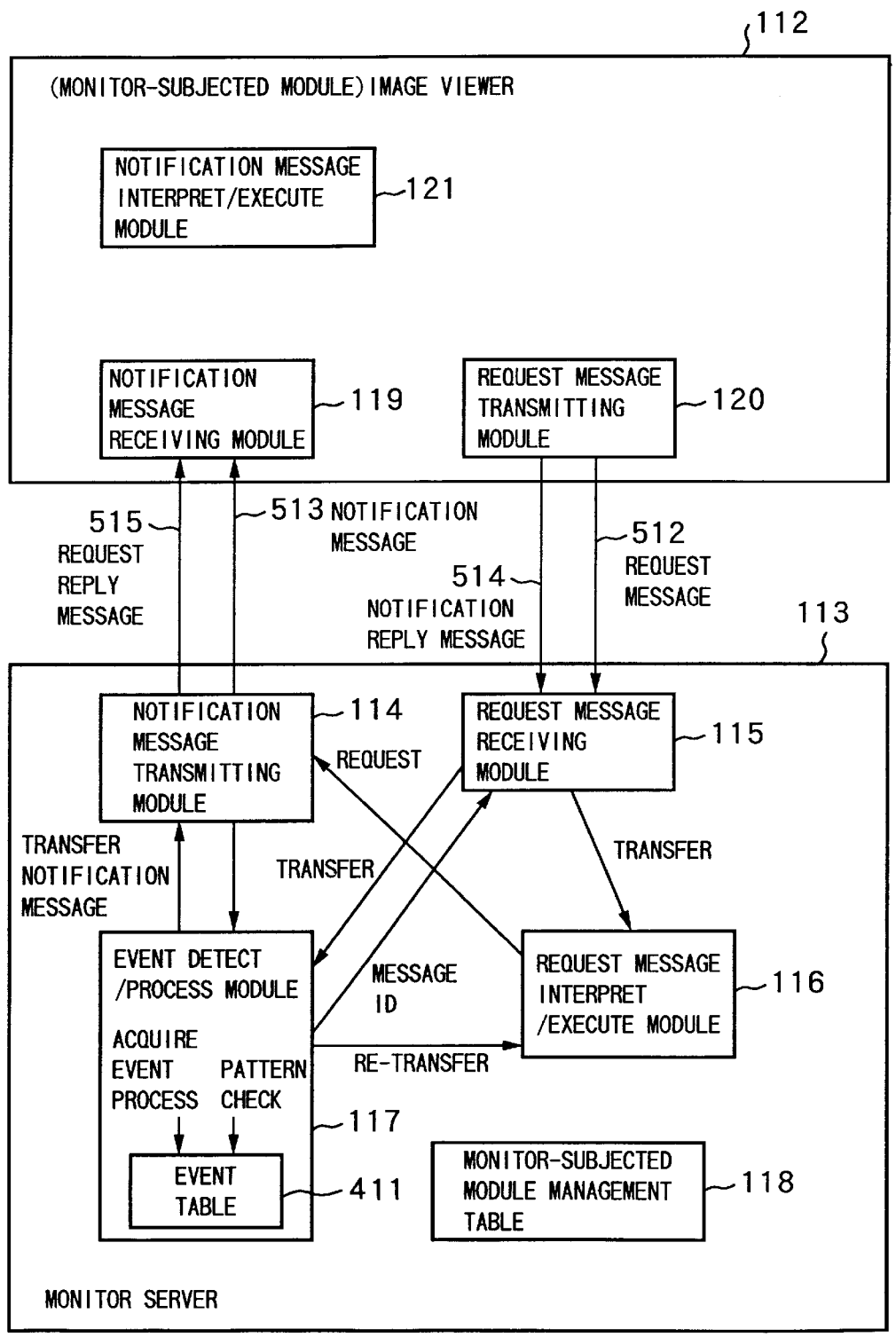
FIG. 13 is an explanatory diagram for the processing in a case where a request message is transmitted by a monitor-subjected module.
Figure 14:
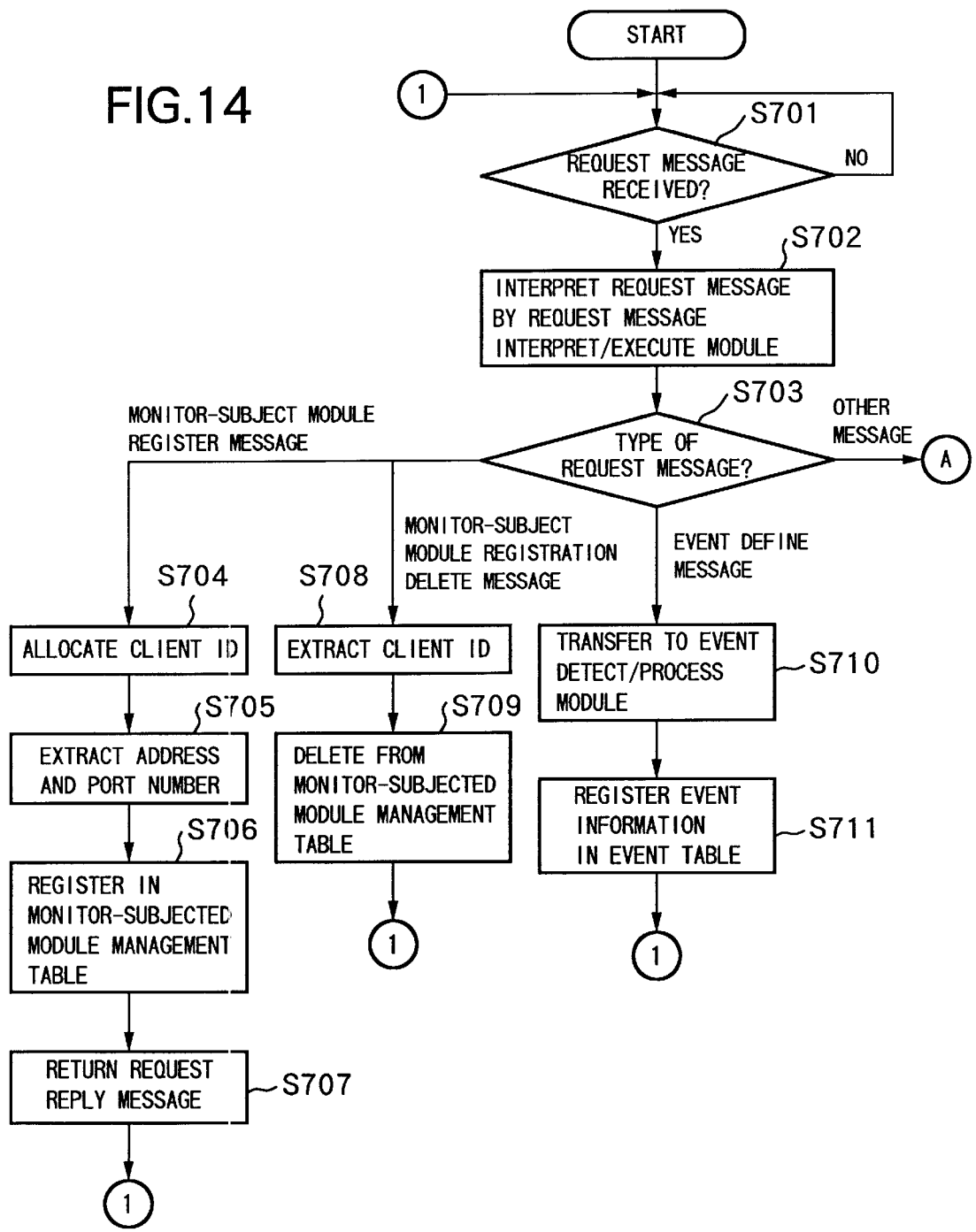
FIG. 14 is a flowchart showing operation steps of the monitor server.
Figure 15:
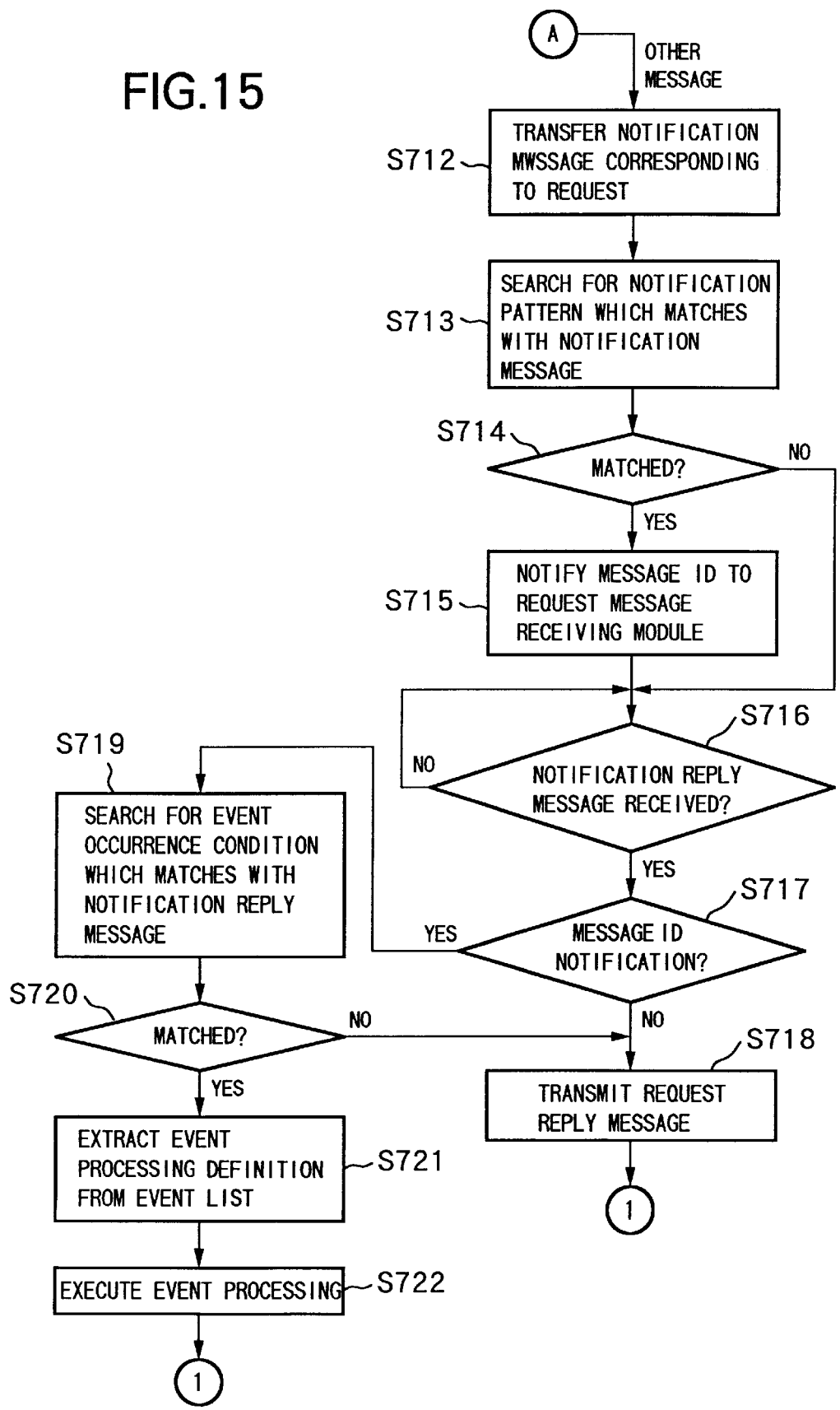
FIG. 15 is a flowchart showing operation steps of the monitor server.

Hereinafter, operation of the monitor server and monitor-subjected module will be described with reference to FIGS. 11 to 15. Note that FIGS. 14 and 15 are flowcharts showing operation steps of the monitor server.

Figure 11:
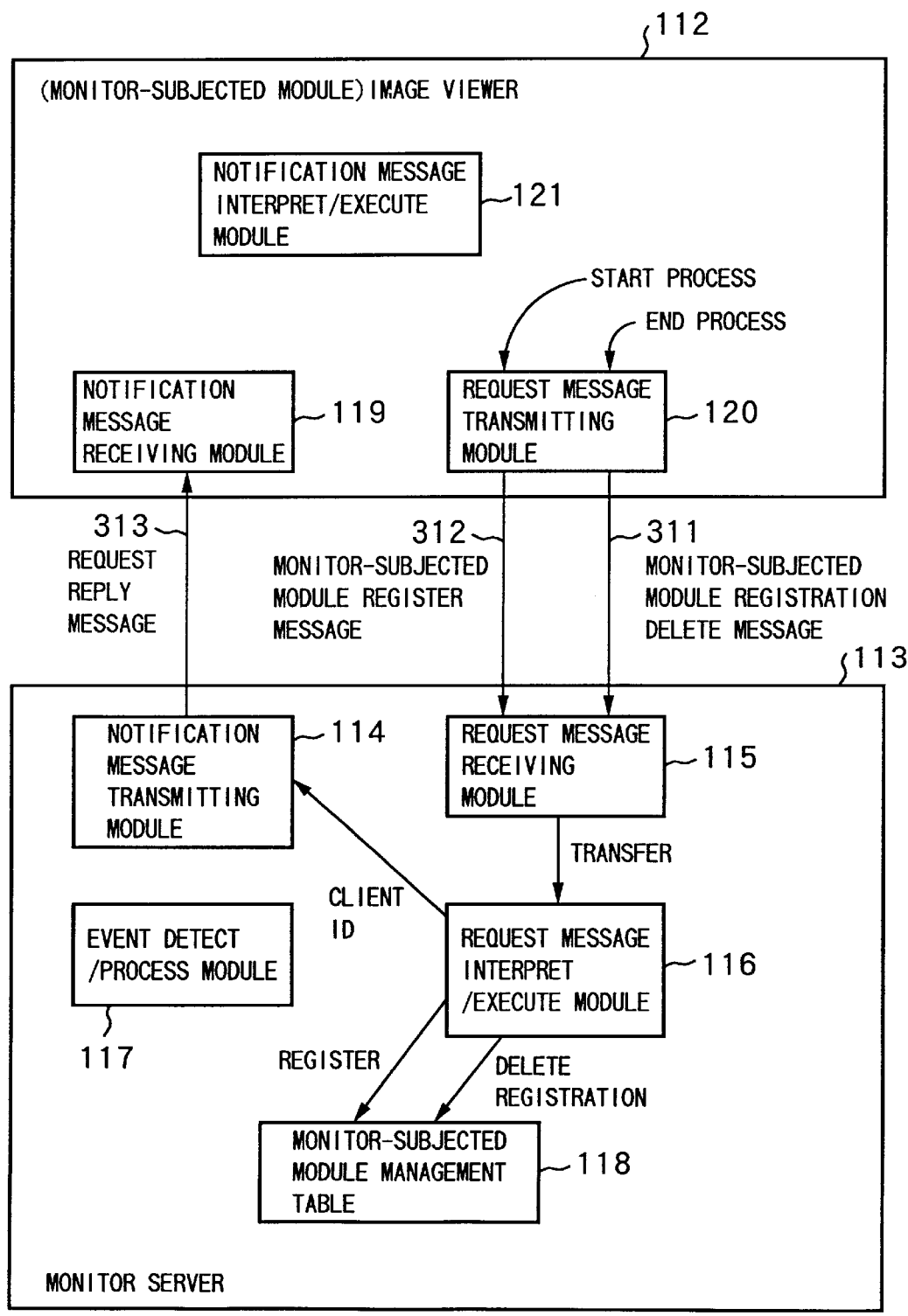
FIG. 11 is a block diagram showing operation of a monitor-subjected module and a monitor server at the time of start-up.

First, processing for starting and ending the monitor-subjected module will be explained with reference to FIGS. 11, 14 and 15. FIG. 11 is an explanatory diagram showing operation of the monitor-subjected module and monitor server at the time of starting the apparatus.

Upon start-up of the monitor server 113, processing proceeds to a request message waiting loop (step S701). When the monitor-subjected module is started (although the following description will be given on the image viewer 112, it may be any other monitor-subjected module), the request message transmitting module 120 in the monitor-subjected module transmits a monitor-subjected module register message 312 to the monitor server 113. The transmitted monitor-subjected module register message 312 is received by a request message receiving module 115 in the monitor server (step S701).

Upon receiving the monitor-subjected module register message 312, the request message receiving module 115 transfers the contents of the message to the request message interpret/execute module 116. The request message interpret/execute module 116 interprets the transferred request message (step S702). If it is interpreted that the transferred message is a monitor-subjected module register message (step S703), a client ID is allocated to the monitor-subjected module (in this example, the image viewer 112) as a new monitor-subjected module (step S704). Then, an address and port number added to the request message 312 is extracted (step S705), and the result is registered in the monitor-subjected module management table 118 (step S706).

Upon completion of the registration, the newly generated client ID is transferred to the notification message transmitting module 114, and a request reply message 313 indicative of completion of registration is returned to the notification message receiving module 119 in the monitor-subjected module (image viewer 112) (step S707).

Note that although the image viewer 112 is described as the monitor-subjected module in the foregoing description, the above processing is performed when any of the image server 110 or relay server 111, which are also the monitor-subjected module, is started.

The similar processing is performed when ending the monitor-subjected module. More specifically, a monitor-subjected module registration delete message 311 is transmitted to the monitor server 113 to start the ending processing of the monitor-subjected module. When the monitor-subjected module registration delete message 311 is received by the request message receiving module 115 in the monitor server 113 (step S701), the message 311 is transferred to the request message interpret/execute module 116 to be interpreted, as similar to the case of registration process (step S702).

When the request message interpret/execute module 116 interprets that the message 311 is a monitor-subjected module registration delete message (step S703), the client ID is extracted from the message (step S708). Utilizing the value as a key, the registration of the monitor-subjected module to be ended is searched in the monitor-subjected module management table 118 and deleted (step S709).

Meanwhile, according to the fourth embodiment, upon registering the image server, negotiation processing starts between the monitor server and image server. FIG. 12 is an explanatory view showing the negotiation processing between the image server and monitor server.

When the registration processing of the image server 110 is completed in the foregoing steps and when the notification message receiving module 119 in the image server 110 receives a request reply message 414, the negotiation processing module 123 starts negotiation processing.

In the process, the negotiation processing module 123 first transmits a series of event define messages 415 via the request message transmitting module 120 to the monitor server 113 in order to define an event such as "crash in the image server", "crash in the relay server" and the like, which is necessary in the remote image service system.

Hereinafter, description will be provided on processing of the event define message. Note that the processing described below is applicable to any of an event define message, event processing define message, or event occurrence condition define message.

The event define message 413 is received by the request message receiving module 115 as similar to receiving a request message (step S701). The request message receiving module transfers the message 413 to the request message interpret/execute module 116 (step S702). However, since the request message interpret/execute module 116 cannot process an event define message, the message is further transferred to the event detect/process module 117 (step S703, S710) The event detect/process module 117 internally has a table (event table 411), and registers the transferred information regarding the event in the table (step S711)

When the negotiation processing module 123 completes transmitting of various event define messages, an event occurrence condition define message and event processing define message are subsequently transmitted and the process similar to that of the event define message is repeated, registering an event occurrence condition as well as event processing in the event table 411.

The following events are defined in the negotiation processing performed by the image server 110 in the fourth embodiment:

"service stop of the image server"
"temporary busy state of the image server"
"service stop of the relay server"
"temporary busy state of the relay server"
"service resumption of the image server"
"service resumption of the relay server"

Followings are examples of event definitions and event processing definitions corresponding to "service stop of the image server":

Event Definition
  define-event name=service stop of image server type= problem default-message="Problem occurred in the image server. Please wait for a while."

Event Processing Definition
  define-event-handler name=service stop of image server{notice-event name=service stop of image server target=all-proxy-server message=""notify-event name=service stop of image server target=all-viewer-client message={service stop of image server.default-message}}

Event occurrence is notified to all the relay servers and image viewers. The default-message value of the event information is given to the image viewer as a message character string to be displayed.

Further, an event occurrence condition corresponding to the "service stop of the image server" is as follows:

Event Occurrence Condition define-event-condition name=service stop of image server (ping target="image server A", result=TIMEOUT)

In other words, if the result of an operation confirmation message transmitted to the "image server A" is TIMEOUT, "service stop of the image server" event occurs.

Since there is only a single negotiation processing module included in FIG. 12, the negotiation processing is completed by the foregoing simple steps. If two or more negotiation processing modules are included, it is possible to perform more complicated negotiation processing such as adding a processing definition by one module to an event defined by another module, or changing an occurrence condition, or the like.

Meanwhile, occurrence of an event, registered in the foregoing manner, is detected and processed in the following manner.

Process of detecting an event occurrence largely differs in a case of a "periodical notification" event from a case of other types of events ("problem" event and "non-periodical" event).

When a "periodical notification" event occurs, time which has passed since the event is registered is checked, and event processing starts at the specified intervals. The processing is executed by the event detect/process module 117. In addition, to check the time passage, a timer mechanism provided by a general operating system may be used. In this case, since checking of time passage is unnecessary, useless CPU occupying time can be reduced.

The process of detecting a "problem" event or a "non-periodical notification" event begins when processing of a notification message starts in response to a periodical notification event or a request message transmitted by the monitor-subjected module. FIG. 13 is an explanatory diagram showing the processing performed when a request message is transmitted by the monitor-subjected module. Hereinafter, the processing will be described assuming that the monitor-subjected module (herein, the image viewer 112) transmits a request message 512.

The request message receiving module 115, which has received the request message 512 from the monitor-subjected module, transfers the message to the request message interpret/execute module 116 (steps S701 and 702). In a case where the request message 512 is a request message other than an event definition protocol (step S703), a request is transmitted to the notification message transmitting module 114, asking to transmit a notification message to the "target" described in the request message 512.

The notification message transmitting module 114 transmits a notification message 513 corresponding to the request. Then, the transmitted message is transferred to the event detect/process module 117 (step S712). Note that although FIG. 13 shows that the "target" of the notification message 513 is the monitor-subjected module (image viewer 112) which has first transmitted the request message 512, this is not always the case.

The event detect/process module 117 which has received the transferred notification message searches for a matching notification message pattern in the event table 411 (step S713). If there is no matching notification message pattern, the event detect/process module 117 performs no processing. Meanwhile, if there is a matching notification message pattern, the message ID of the notification message is notified to the request message receiving module 115 (steps S714 and S715).

When the request message receiving module 115 receives a notification reply message 514 in response to the notification message 513, the message 514 is normally transferred to the request message interpret/execute module 116 (steps S716, S717, S718). The request message interpret/execute module 116 further converts the notification reply message 514 to a request reply message 515, and the request reply message 515 is returned via the notification message transmitting module 114 to the monitor-subjected module which has initially transmitted the request message (step S718)

Meanwhile, in a case where the request message receiving module 115 has already received a notification indicative of a message ID from the event detect/process module 117, the notification reply message 514 is first processed by the event detect/process module 117 (step S717). The event detect/process module 117 checks additional information of the notification reply message to determine whether or not the information satisfies an event occurrence condition of the notification message pattern matched in step S714. If a match is not found, the notification reply message is re-transferred to the request message interpret/execute module 116 to be returned as usual, to the monitor-subjected module (steps S720, S718).

Meanwhile, in a case where the additional information of the notification reply message satisfies the event occurrence condition, event occurrence processing is executed and a normal reply will not be transmitted. In this case, the event detect/process module 117 searches for the occurred event in the event table 411 to extract an event processing definition (steps S720, S721). Then, contents of the event processing definition is interpreted and executed (step S722).

In the above-described manner, event detection and processing defined in the negotiation processing are performed.

Operation of the user interface module 122, which is unique to a client apparatus (image viewer), will now be described.

Upon occurrence of a "periodical notification" event or transmission of an operation state obtain request message, the monitor server 113 transmits, to a client, an operation state notification message of the image server and relay server. The client extracts necessary additional information from the operation state notification message, and updates displayed data in the user interface module 122 based on the extracted values. By taking advantage of a "periodical notification event," the operation state is periodically updated. Thus, a user is able to obtain the latest operation state.

Moreover, as mentioned in the foregoing description, an operation state of the system can be changed by adjusting the thickness of the arrow or the size of the dark portion in the user interface shown in FIG. 10.

Changing Size of Dark Portion

By changing the size of the dark (hatched) portion of the figures in FIG. 10, an occupying rate of the CPU (CPU occupying rate) by the monitor-subjected module (image server) corresponding to the figure, can be changed.

In the fourth embodiment, the proportion of the dark portion to the entire figure is defined as the CPU occupying rate. When the CPU occupying rate is 100%, the monitor-subjected module completely occupies the CPU. When the CPU occupying rate is 0%, the monitor-subjected module is not operating.

According to the present embodiment, if a half of the figure is designated to be dark, that means that 50% of the CPU is occupied. For instance, when the dark portion of the FIG. 202 indicative of an image server A is changed to occupy 80% of the CPU, the operation is converted to the following request message:

req-set-parameter target="image server A" CPU occupying rate=80%

The request message is converted to the following notification message in accordance with the normal process of a request message in the monitor server and transmitted to the image server A:

notice-set-parameter target="image server A" CPU occupying rate=80%

The image server A which has received the notification message changes the occupying rate of the CPU in accordance with the instruction of the CPU occupying rate included in the notice-set-parameter message, by utilizing function provided by an operating system (e.g. in a case of UNIX, nice system call or the like).

Changing Thickness of Arrow

By changing the thickness of the arrow shown in FIG. 10, an amount of data transmitted in a communication path, which is represented by the arrow, is changed. In the fourth embodiment, the rate of change in the thickness of the arrow corresponds to a changing rate in the data amount. For instance, changing the size of the arrow twice as thick is equivalent to transmitting twice the amount of data.

For example, when the size of the arrow 207, indicative of a communication path between the image server A and relay server a, is changed to twice as thick, the operation is converted to the following request message:

> req-set-parameter target="image server A" data amount changing rate=200%

Herein, the "target" is the image server A whose data amount is to be controlled. Note that in a case where the relay server a controls an amount of data in a system employing a different method, the relay server a may be designated as the "target". The above request message is converted to the following notification message in accordance with the normal process of a request message in the monitor server and transmitted to the image server A:

> notice-set-parameter target="image server A" data amount changing rate=200%

The image server A which has received the above message changes the amount of data transmitted in the communication path in accordance with the instructed data amount changing rate, by changing an image compression rate or the number of colors of an image.

Note that various methods of setting may be applied to the present embodiment, without being limited to the setting of the thickness of the arrow and the size of the dark portion in the figure as shown in FIG. 10.

As set forth above, according to the present embodiment, an operation state monitoring mechanism having an event detect/process module is provided as a monitor server, and an operation state processing mechanism is included in other monitor-subjected modules (image server, relay server and image viewer).

Moreover, by specifying protocols for event definition necessary for monitoring the operation state by the operation state monitoring mechanism or handling problems, negotiation processing is performed between the monitor server and the negotiation processing module in the image server.

Furthermore, the monitor server and a monitor-subjected module exchanges a request message and a notification message. This enables each monitor-subjected module to obtain information related to the operation state of the entire system. Also a user interface is provided for graphically presenting a user with the operation state of the system based on the information.

Note that although the present embodiment describes the remote image service system as an application example, other audio-based and character-based service systems constructed with the similar main server, relay server and client can be monitored by the method same as that of the present embodiment.

Moreover, a plurality of the above-described main server, relay server and client (image viewer) may be included. In addition, the relay server need not be included.

An effect uniquely obtained by the present embodiment is that, since the operation state monitoring mechanism is provided independently as a monitor server, a monitor-related portion in a monitor-subjected module can be kept small. Therefore, the monitoring mechanism can be readily incorporated in an existing service system.

In addition, by virtue of the user interface; a user can monitor the operation state of the entire system. Therefore, even in a case where the system cannot sufficiently handle a problem, a user is able to perform appropriate processing.

Fifth Embodiment

Next, the fifth embodiment of the present invention will be described. Note that the remote image service system similar to that of the fourth embodiment is used in the fifth embodiment. However, the method of realizing the invention is different from that of the fourth embodiment. More specifically, according to the fifth embodiment, the portion corresponding to the monitor server is not provided as an independent server, but is realized as a library routine in each monitor-subjected module.

Each component shown in FIG. 16 has the same function as that of the component with the same reference numeral in FIG. 8, except that the function of the monitor server 113 (FIG. 8) is included in the image viewer 112 as a monitor module 613 in FIG. 16. Furthermore, as similar to FIG. 8, the monitor-embedded module 124 is incorporated not only in the image server 110 but also in the relay server 111 in FIG. 16. Note that the monitor embedded module 124 according to the fifth embodiment includes both the negotiation processing module 123 and user interface module 12Z. Moreover, a monitor module 613 is incorporated not only in the image server 110 but also in the relay server 111, as similar to the monitor-embedded module 124.

Processing performed by each component in the fifth embodiment is almost the same as that of the fourth embodiment. Thus, hereinafter, the difference from the fourth embodiment will be described.

(1) Applying Broadcast Mechanism

In the fifth embodiment, a request message issued in the start-up process or the like is broadcast to all components (image server 110, relay server 111, image viewer 112) in the system. Besides this point, each component performs the similar processing as the processing shown in FIGS. 11 to 15.

(2) Negotiation Processing

In the fourth embodiment, only the image server 110 has the negotiation processing module 123. However, in the fifth embodiment, all components have the negotiation processing module 123. Each negotiation processing module is capable of negotiating with an arbitrary monitor module provided as a component, utilizing the protocol described in the fourth embodiment.

Accordingly, different events can be registered in the event detect/process module 116 of each module. For instance, events related to the image viewer 112 and image server 110 may be defined in the relay server 111, while only an event related to the relay server 111 is defined in the image server 110 and image viewer 112.

Moreover, by including a server having a special function (e.g. server for storing images), an independent event definition can be added.

As described above, according to the fifth embodiment, each component of the service system is able to independently monitor the operation state by incorporating the monitor module, serving as an operation state monitoring mechanism, into each component. Therefore, even in a case where a component having new function is added to the service system, correction need not be added to other components of the system.

As described above, according to the fourth and fifth embodiments, it is possible to provide a monitor mechanism which is applicable to an arbitrary service. In addition, at the time of start-up or during operation of the system, an appropriate problem-coping processing can be designated. Furthermore, the present invention provides a monitoring mechanism which is applicable to a case where plural services are combined.

Note that in the service system of the abovedescribed fourth and fifth embodiments, each monitor-subjected module must know an address for accessing the monitor server. To realize this, for instance, an address of the monitor server is decided when a monitor-embedded module is incorporated in a monitor-subjected module, or the address of the monitor server is broadcast in the system. Particularly, the second embodiment is able to take advantage of the broadcasting mechanism, to broadcast a notification request asking for an address of the monitor server.

As has been described above, the present invention provides a monitoring mechanism applicable to an arbitrary service system for monitoring each component in the system, which enables to improve operability in the service system.

Moreover, even in a case where plural services are integrated, the present invention can appropriately monitor the operation state of each module which constitutes the service system.

Note that the present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the claims.

What is claimed is:

1. An information processing system constructed by including a server which obtains and transfers data in real time and a client who processes data transmitted by the server, said server comprising:

determining means for determining whether or not a number of predetermined types of access requests received by the server exceeds a predetermined permissible number which is varied in accordance with a condition of said server; and transferring means for transferring access state information, which indicates how congested the server is, to the client who has transmitted a predetermined type of access request, in accordance with the determining result made by said determining means, and said client comprising:

displaying means for, upon transmitting the predetermined type of access request to the server and receiving the access state information from said transferring means, displaying the access state on the basis of the access state information.

2. An information processing system constructed by including a server and a client who processes data transmitted by the server, said server comprising:

determining means for determining whether or not a number of predetermined types of access requests received by the server exceeds a predetermined permissible number; and transferring means for transferring access state information, which indicates how congested the server is, to the client who has transmitted a predetermined type of access request, in accordance with the determining result made by said determining means, and said client comprising:

displaying means for, upon transmitting the predetermined type of access request to the server and receiving the access state information from said transferring means, displaying the access state on the basis of the access state information; and wherein the access state information transferred by said transferring means includes the number of present accesses, the number of accesses rejected in the last predetermined time period and the number of accesses permitted in the last predetermined time period.

3. An information processing system constructed by including a server and a client who processes data transmitted by the server, said server comprising:

determining means for determining whether or not a number of predetermined types of access requests received by the server exceeds a predetermined permissible number, and transferring means for transferring access state information, which indicates how congested the server is, to the client who has transmitted a predetermined type of access request, in accordance with the determining result made by said determining means, said client comprising:

displaying means for, upon transmitting the predetermined type of access request to the server and receiving the access state information from said transferring means, displaying the access state on the basis of the access state information; and wherein the access state information transferred by said transferring means includes the number of received accesses counted in a predetermined time interval, the number of rejected accesses counted in the predetermined time interval and the number of permitted accesses counted in the predetermined time interval.

4. The information processing system according to claim 3, wherein said displaying means displays a graph on the basis of the access state information transferred by said transferring means.

5. An information processing system constructed by including a server and a client who processes data transmitted by the server, said server comprising:

determining means for determining whether or not a number of predetermined types of access requests received by the server exceeds a predetermined permissible number; and transferring means for transferring access state information, which indicates how congested the server is, to the client who has transmitted a predetermined type of access request, in accordance with the determining result made by said determining means, and said client comprising:

displaying means for, upon transmitting the predetermined type of access request to the server and receiving the access state information from said transferring means, displaying the access state on the basis of the access state information;

wherein the server transmits image data to the client, and the predetermined type of access request includes a connection request to be connected with the server to receive the image data; and wherein the client further comprises request means for requesting to transfer the access state information by the transferring means, while receiving and displaying the image data from the server.

6. A server for transferring image data to a client in a remote location in accordance with an instruction from the client, comprising:

determining means for, in a case where a predetermined type of access request is transmitted by the client, determining whether or not a number of predetermined types of access requests received by the server exceeds a predetermined permissible number;

transferring means for, in a case where said determining means determines that the number of the access requests exceeds the permissible number, transferring access state information, which indicates how congested the server is, to the client; and wherein the server transfers an image sensed by controllable image sensing means, and the predetermined type of access request includes a control request to control operation of the image sensing means.

7. A server for transferring image data to a client in a remote location in accordance with an instruction from the client, comprising:

determining means for, in a case where a predetermined type of access request is transmitted by the client, determining whether or not a number of predetermined types of access requests received by the server exceeds a predetermined permissible number;

transferring means for, in a case where said determining means determines that the number of the access requests exceeds the permissible number, transferring access state information, which indicates how congested the server is, to the client;

wherein the server transfers an image sensed by controllable image sensing means, and the predetermined type of access request includes a control request to control operation of the image sensing means; and wherein the access state information transferred by said transferring means includes the number of present accesses, the number of accesses rejected in the last predetermined time period and the number of accesses permitted in the last predetermined time period.

8. A server for transferring image data to a client in a remote location in accordance with an instruction from the client, comprising:

determining means for, in a case where a predetermined type of access request is transmitted by the client, determining whether or not a number of predetermined types of access requests received by the server exceeds a predetermined permissible number; transferring means for, in a case where said determining means determines that the number of the access requests exceeds the permissible number, transferring access state information, which indicates how congested the server is, to the client; and wherein the access state information transferred by said transferring means includes the number of received accesses counted in a predetermined time interval, the number of rejected accesses counted in a predetermined time interval and the number of permitted accesses counted in a predetermined time interval.

9. A server for transferring image data to a client in a remote location in accordance with an instruction from the client, comprising:

determining means for, in a case where a predetermined type of access request is transmitted by the client, determining whether or not a number of predetermined types of access requests received by the server exceeds a predetermined permissible number;

transferring means for, in a case where said determining means determines that the number of the access requests exceeds the permissible number, transferring access state information, which indicates how congested the server is, to the client;

wherein the predetermined type of access request includes a connection request from the client which requests the server to transfer the image data;

further comprising control means for activating said transferring means in accordance with the request from the client, during transfer of the image data to the client.

10. A server for transferring image data to a client in a remote location in accordance with an instruction from the client, comprising:

determining means for, in a case where a predetermined type of access request is transmitted by the client, determining whether or not a number of predetermined types of access quests received by the server exceeds a predetermined permissible number;

transferring means for, in a case where said determining means determines that the number of the access requests exceeds the permissible number, transferring access state information, which indicates how congested the server is, to the client;

wherein the server transfers an image sensed by controllable image sensing means, and the predetermined type of access request includes a control request to control operation 5 of the image sensing means.

11. The server according to claim 10, said transferring means generates image data on the basis of the access state information indicative of the access state, and transfers the generated image data to the client as an image sensed by the image sensing means.

12. A client to be connected with a server which transfers image data, comprising:

request transmitting means for transmitting a predetermined type of access request to the server;

displaying means for, upon transmitting the predetermined type of access request by said request transmitting means and receiving access state information indicative of an access state from the server, displaying the access state on the basis of the access state information;

wherein the server transfers an image sensed by controllable image sensing means, and the predetermined type of access request includes a control request to control operation of the image sensing means.

13. The client according to claim 12, the predetermined type of access request includes a connection request which requests the server to transfer image data.

14. A control method of controlling a server which transfers an image sensed by a camera apparatus to a client in a remote location in accordance with an instruction from the client, comprising:

a determining step of determining whether or not a number of predetermined types of access requests received by the server is within a predetermined permissible range;

a transferring step of transferring access state information, which indicates how congested the server is, to the client in accordance with the determination in said determining step; and wherein the access state information includes the number of present accesses, the number of accesses rejected in the last predetermined time period and the number of accesses permitted in the last predetermined time period.

15. A control method of controlling a client who is to be connected with a server which transfers image data, comprising:

a request transmitting step of transmitting a predetermined type of access request to the server;

a displaying step of displaying, upon transmitting the predetermined type of access request in said request transmitting step and receiving access state information, which indicates how congested the server is, from the server, displaying the access state on the basis of the access state information; and wherein the server transfers an image sensed by controllable image sensing means, and the predetermined type of access request includes a control request to control operation of the image sensing operations.

16. A monitor system for monitoring an operation state of a service system which provides a predetermined service in a computer network, comprising:

a monitor module communicable with other modules, which is provided separately from a plurality of service modules entered into the service system;

receiving means for receiving, in said monitor module, a message from the plurality of service modules;

communication means for performing communication between said monitor module and the plurality of service modules on the basis of the message;

processing means for executing corresponding processing on the basis of contents notified by said communications means; and wherein the message is a request message for requesting a notification of an operation state of a service module, said communication means receives the notification of an operation state from the service module which is designated by the request message.

17. The monitor system according to claim 16, wherein said processing means notifies the operation state to the service module which has transmitted the request message, on the basis of the contents notified by said communication means.

18. The monitor system according to claim 16, further comprising detecting means for detecting occurrence of an event on the basis of information received by said receiving means and said communication means, wherein said processing means executes the event detected by said detecting means.

19. The monitor system according to claim 18, wherein said detecting means includes an event table in which an event to be detected and corresponding process contents are registered, and detects occurrence of the event registered in the event table on the basis of the information received by said receiving means and communication means, and wherein said processing means executes the corresponding process registered in the event table when the event is detected by said detecting means.

20. The monitor system according to claim 18, further comprising registering means for receiving information indicative of an event and corresponding process contents from the service module and registering the received information in the event table.

21. The monitor system according to claim 20, wherein the service system is a system adopting a server-client form, and said registering means receives information indicative of an event and corresponding process contents from a server of the service system and registers the received information in the event table.

22. The monitor system according to claim 18, wherein said monitor module further comprises a periodical requesting means for transmitting a request to the service module to notify a predetermined information at predetermined intervals, and said detecting means detects, based on a response to the request of said periodical requesting means, whether or not the event registered in the event table has occurred.

23. The monitor system according to claim 16, wherein said monitor module is provided as an independent program.

24. The monitor system according to claim 16, wherein each of the plurality of service modules has a monitor-subjected module, comprising:

transmitting/receiving means for transmitting the request message to the monitor module and receiving operation information transmitted by said processing means; and displaying means for displaying an operation state for an operator on the basis of the received operation information.

25. The monitor system according to claim 24, wherein said monitor-subjected module further comprises state notifying means for notifying an operation state to the monitor module in response to the request for notification of the operation state transmitted from the monitor module by said communication means.

26. The monitor system according to claim 24, wherein said monitor-subjected module is provided by being incorporated in a module whose operation state is subjected to be monitored.

27. The monitor system according to claim 24, wherein said displaying means displays the operation state received by said transmitting/receiving means with figures having different colors, each figure representing each of the modules.

28. The monitor system according to claim 27, wherein said displaying means shows a connection relation of each of the modules in the service system and a data communication state among the modules, by displaying a line which connects the figures representing respective modules and a thickness of the line, on the basis of the operation state of each service module received by said transmitting/receiving means.

29. The monitor system according to claim 28, further comprising operation means for changing the operation state of each service module and the state of data communication between the modules by operating the figures displayed by said displaying means.

30. The monitor system according to claim 24, wherein said monitor-subjected module further comprises event notifying means for notifying an event to be registered by said registering means in the monitor module.

31. The monitor system according to claim 30, wherein said event notifying means specifies for the monitor module, an event occurrence condition, processing to be performed at the time of event occurrence and information to be added to an event.

32. The monitor system according to claim 30, wherein the service system is a system adopting a server-client form, and said event notifying means is incorporated in the monitor-subjected module of the server.

33. The monitor system according to claim 16, wherein said monitor module is provided by being incorporated in each service module which is entered in the service system.

34. The monitor system according to claim 30, wherein each module in the service system comprises said event notifying means.

35. The monitor system according to claim 16, wherein the service system is an image transmission service which obtains an image by controlling a camera in accordance with an instruction from a client apparatus and transmits the obtained image to the client apparatus.

* * * * *

UNITED STATES PATENT AND TRADEMARK OFFICE
CERTIFICATE OF CORRECTION

PATENT NO.   : 6,088,737
DATED        : July 11, 2000
INVENTOR(S)  : Koichi Yano et al.

It is certified that error appears in the above-identified patent and that said Letters Patent is hereby corrected as shown below:

Column 12,
Line 13, "SubjectedModule" should read -- Subjected Module --.

Column 23,
Line 1, "server a," should read -- server $\underline{a}$, --.
Line 7, "server a" should read -- server $\underline{a}$ --.
Line 8, "server a" should read -- server $\underline{a}$ --.

Column 24,
Line 15, "12Z." should read -- 122. --.

Column 28, claim 10,
Line 39, "quests" should read -- requests --.

Signed and Sealed this

Eighth Day of January, 2002

*Attest:*

JAMES E. ROGAN
*Director of the United States Patent and Trademark Office*

*Attesting Officer*